United States Patent
Kitazato et al.

(10) Patent No.: US 10,979,163 B2
(45) Date of Patent: *Apr. 13, 2021

(54) RECEPTION APPARATUS, TRANSMISSION APPARATUS, AND DATA PROCESSING METHOD

(71) Applicant: SATURN LICENSING LLC, New York, NY (US)

(72) Inventors: Naohisa Kitazato, Tokyo (JP); Yoshiharu Dewa, Tokyo (JP); Yasuaki Yamagishi, Kanagawa (JP); Jun Kitahara, Shizuoka (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,656

(22) Filed: Nov. 27, 2019

(65) Prior Publication Data

US 2020/0099460 A1     Mar. 26, 2020

Related U.S. Application Data

(63) Continuation of application No. 15/761,611, filed as application No. PCT/JP2016/077788 on Sep. 21, 2016, now Pat. No. 10,516,497.

(30) Foreign Application Priority Data

Oct. 5, 2015   (JP) .................................. 2015-197391

(51) Int. Cl.
*H04N 21/433*   (2011.01)
*H04H 60/73*    (2008.01)
(Continued)

(52) U.S. Cl.
CPC .......... *H04H 60/73* (2013.01); *H04N 21/433* (2013.01); *H04N 21/435* (2013.01);
(Continued)

(58) Field of Classification Search
CPC ........ H04H 60/73; H04H 20/28; H04H 20/91; H04N 21/433; H04N 21/4348;
(Continued)

(56) References Cited

U.S. PATENT DOCUMENTS 9,015,773 B2 *   4/2015   Kim .................... H04N 21/4722
                                                        725/73
9,060,151 B2 *   6/2015   Kim .................... H04N 7/0885
(Continued)

FOREIGN PATENT DOCUMENTS

WO      2014/057830 A1      4/2014
WO      WO 2014/061272 A1   4/2014

OTHER PUBLICATIONS

"ATSC Standard: Non-Real-Time Content Delivery A/103:2014," Advanced Television Systems Committee, Jul. 25, 2014, 162 pages.
(Continued)

*Primary Examiner* — Hai V Nguyen
(74) *Attorney, Agent, or Firm* — Oblon, McClelland, Maier & Neustadt, L.L.P.

(57) ABSTRACT

A reception apparatus includes receiver circuitry configured to receive a digital broadcast signal and processing circuitry. The processing circuitry is configured to acquire a first application that handles acquisition of content reproduced in non-realtime, the first application acquired on the basis of first signaling data included in the digital broadcast signal. The processing circuitry is further configured to acquire metadata, which includes information for controlling the content acquisition in response to operation of the first application, the metadata included in the digital broadcast (Continued)

signal. The processing circuitry is further configured to control acquisition of the content reproduced in non-realtime by controlling the operation of the first application on the basis of the metadata.

20 Claims, 27 Drawing Sheets

(51) Int. Cl.
  *H04N 21/435* (2011.01)
  *H04N 21/443* (2011.01)
  *H04N 21/462* (2011.01)
  *H04N 21/434* (2011.01)
  *H04N 21/438* (2011.01)
  *H04N 21/643* (2011.01)
  *H04H 20/91* (2008.01)
  *H04H 20/28* (2008.01)

(52) U.S. Cl.
  CPC ..... *H04N 21/4348* (2013.01); *H04N 21/4383* (2013.01); *H04N 21/4431* (2013.01); *H04N 21/4622* (2013.01); *H04N 21/64322* (2013.01); *H04H 20/28* (2013.01); *H04H 20/91* (2013.01)

(58) Field of Classification Search
  CPC ............. H04N 21/435; H04N 21/4383; H04N 21/4431; H04N 21/4622; H04N 21/64322
  USPC .......................................................... 455/3.1
  See application file for complete search history.

(56) References Cited

U.S. PATENT DOCUMENTS

| | | | |
|---|---|---|---|
| 9,264,648 B2 * | 2/2016 | Kitahara | H04N 21/4722 |
| 9,264,759 B2 * | 2/2016 | Lee | H04N 21/8133 |
| 9,326,045 B2 * | 4/2016 | Lee | H04N 21/2353 |
| 9,596,510 B2 * | 3/2017 | Moon | H04N 21/462 |
| 9,661,371 B2 * | 5/2017 | Moon | H04N 21/4126 |
| 9,667,902 B2 * | 5/2017 | Kim | H04N 21/8126 |
| 9,712,864 B2 * | 7/2017 | Lee | H04N 21/4622 |
| 9,716,912 B2 * | 7/2017 | Lee | H04N 21/266 |
| 9,723,362 B2 * | 8/2017 | Kim | H04N 21/4331 |
| 9,838,741 B2 * | 12/2017 | Moon | H04N 21/6125 |
| 9,883,239 B2 * | 1/2018 | Lee | H04N 21/23614 |
| 9,948,990 B2 * | 4/2018 | Lee | H04N 21/482 |
| 9,986,198 B2 * | 5/2018 | Kitahara | H04N 21/8173 |
| 10,516,497 B2 * | 12/2019 | Kitazato | H04N 21/4431 |
| 2003/0229900 A1 * | 12/2003 | Reisman | H04N 21/42204 725/87 |
| 2006/0253874 A1 * | 11/2006 | Stark | H04N 21/4825 725/62 |
| 2010/0050217 A1 * | 2/2010 | Suh | H04N 21/235 725/87 |
| 2011/0075990 A1 * | 3/2011 | Eyer | H04N 21/4722 386/241 |
| 2011/0246488 A1 * | 10/2011 | Eyer | G06Q 30/0203 707/754 |
| 2011/0302611 A1 * | 12/2011 | Eyer | H04N 21/433 725/46 |
| 2012/0054214 A1 * | 3/2012 | Yamagishi | H04N 21/4755 707/758 |
| 2012/0054235 A1 * | 3/2012 | Kitazato | H04N 21/6543 707/770 |
| 2012/0054267 A1 * | 3/2012 | Yamagishi | H04L 67/42 709/203 |
| 2012/0054268 A1 * | 3/2012 | Yamagishi | H04N 21/6582 709/203 |
| 2012/0054783 A1 * | 3/2012 | Yamagishi | H04L 67/42 725/13 |
| 2012/0054816 A1 * | 3/2012 | Dewa | H04N 21/8166 725/116 |
| 2012/0060197 A1 * | 3/2012 | Kitahara | H04N 21/6175 725/131 |
| 2012/0082266 A1 * | 4/2012 | Kitazato | H04H 20/106 375/316 |
| 2012/0084829 A1 * | 4/2012 | Kitazato | H04N 21/84 725/110 |
| 2012/0253826 A1 * | 10/2012 | Kitazato | H04N 21/443 704/500 |
| 2012/0274848 A1 * | 11/2012 | Kitahara | H04N 21/47214 348/473 |
| 2013/0036440 A1 * | 2/2013 | Eyer | H04H 20/59 725/40 |
| 2013/0055313 A1 * | 2/2013 | Eyer | H04N 21/6125 725/49 |
| 2013/0103716 A1 * | 4/2013 | Yamagishi | H04N 21/8358 707/770 |
| 2013/0133014 A1 * | 5/2013 | Kim | H04N 21/4345 725/86 |
| 2013/0139199 A1 * | 5/2013 | Lee | H04N 21/435 725/40 |
| 2013/0254828 A1 * | 9/2013 | Reimers | H04N 21/44209 725/134 |
| 2013/0311669 A1 * | 11/2013 | Reimers | H04H 60/41 709/231 |
| 2014/0099078 A1 * | 4/2014 | Kitahara | H04N 21/4622 386/248 |
| 2014/0109128 A1 * | 4/2014 | Lee | H04N 21/4622 725/25 |
| 2014/0143811 A1 * | 5/2014 | Lee | H04N 21/266 725/47 |
| 2014/0181887 A1 * | 6/2014 | Moon | H04N 21/4349 725/133 |
| 2014/0201796 A1 * | 7/2014 | Moon | H04N 21/4345 725/110 |
| 2014/0201797 A1 * | 7/2014 | Kim | H04N 21/26241 725/116 |
| 2014/0204271 A1 * | 7/2014 | Kim | H04N 5/44 348/553 |
| 2015/0052570 A1 * | 2/2015 | Lee | H04N 21/435 725/110 |
| 2015/0156546 A1 * | 6/2015 | Moon | H04N 21/64322 725/110 |
| 2015/0350719 A1 * | 12/2015 | Kim | H04N 21/8586 725/32 |
| 2016/0112671 A1 * | 4/2016 | Kitahara | H04N 21/8173 386/240 |
| 2016/0134927 A1 * | 5/2016 | Kitazato | H04N 21/2381 725/110 |
| 2016/0227288 A1 * | 8/2016 | Lee | H04N 21/482 |
| 2016/0277788 A1 * | 9/2016 | Lee | H04N 21/84 |
| 2017/0013028 A1 * | 1/2017 | Yang | H04N 21/235 |
| 2017/0223432 A1 * | 8/2017 | Lee | H04N 21/8173 |
| 2017/0374429 A1 * | 12/2017 | Yang | H04N 21/8545 |
| 2018/0026733 A1 * | 1/2018 | Yang | H04L 65/608 725/33 |
| 2018/0035153 A1 * | 2/2018 | Yang | H04N 21/4104 |
| 2018/0131972 A1 * | 5/2018 | Yamagishi | H04N 21/44222 |
| 2018/0159644 A1 * | 6/2018 | Yang | H04N 21/27 |

OTHER PUBLICATIONS

"ATSC Standard: Non-Real-Time Content Delivery A/103:2014," Advanced Television Systems Committee, Jul. 25, 2014, 9 pages.
International Search Report dated Dec. 27, 2016 in PCT/JP2016/077788 filed Sep. 21, 2016.

* cited by examiner

FIG. 4

| No | NRT SERVICE | TYPE | DESCRIPTION |
|---|---|---|---|
| 1 | NRT EMBEDDED TV SERVICE (NRT embedded TV Service) | — | SERVICE THAT EXECUTES A LINKED APPLICATION (Linked App), TRANSPORTED AS AN NRT COMPONENT, IN A LINKED MANNER WITH BROADCASTING CONTENT |
| 2 | FOREGROUND NRT SERVICE (Foreground NRT Service) | — | SERVICE THAT DISPLAYS A FOREGROUND APPLICATION (FG App), TRANSPORTED AS AN NRT COMPONENT, AS A PORTAL PAGE |
| 3 | BACKGROUND NRT SERVICE (Background NRT Service) | APP DATA TYPE | SERVICE THAT DOWNLOADS NRT CONTENT IN RESPONSE TO NRT SERVICE RESERVATION TUNING USING A BACKGROUND APPLICATION (BG App) TRANSPORTED AS AN NRT COMPONENT. IN APP DATA TYPE, A TARGET FILE GROUP (Stored App, AITs) AND ITS REFERENCE FILE GROUP (Content Meta, Content Resource) ARE TRANSPORTED, AND A STORED APPLICATION (Stored App) PERFORMS PROCESSES ON THE REFERENCE FILE GROUP. |
| 3 | BACKGROUND NRT SERVICE (Background NRT Service) | RAW DATA TYPE | SERVICE THAT DOWNLOADS NRT CONTENT IN RESPONSE TO NRT SERVICE RESERVATION TUNING USING A BACKGROUND APPLICATION (BG App) TRANSPORTED AS AN NRT COMPONENT. IN RAW DATA TYPE, ONLY A REFERENCE FILE GROUP (Content Meta, Content Resource) IS TRANSPORTED, AND AN EXTERNAL APPLICATION PERFORMS PROCESSES ON THE REFERENCE FILE GROUP. |

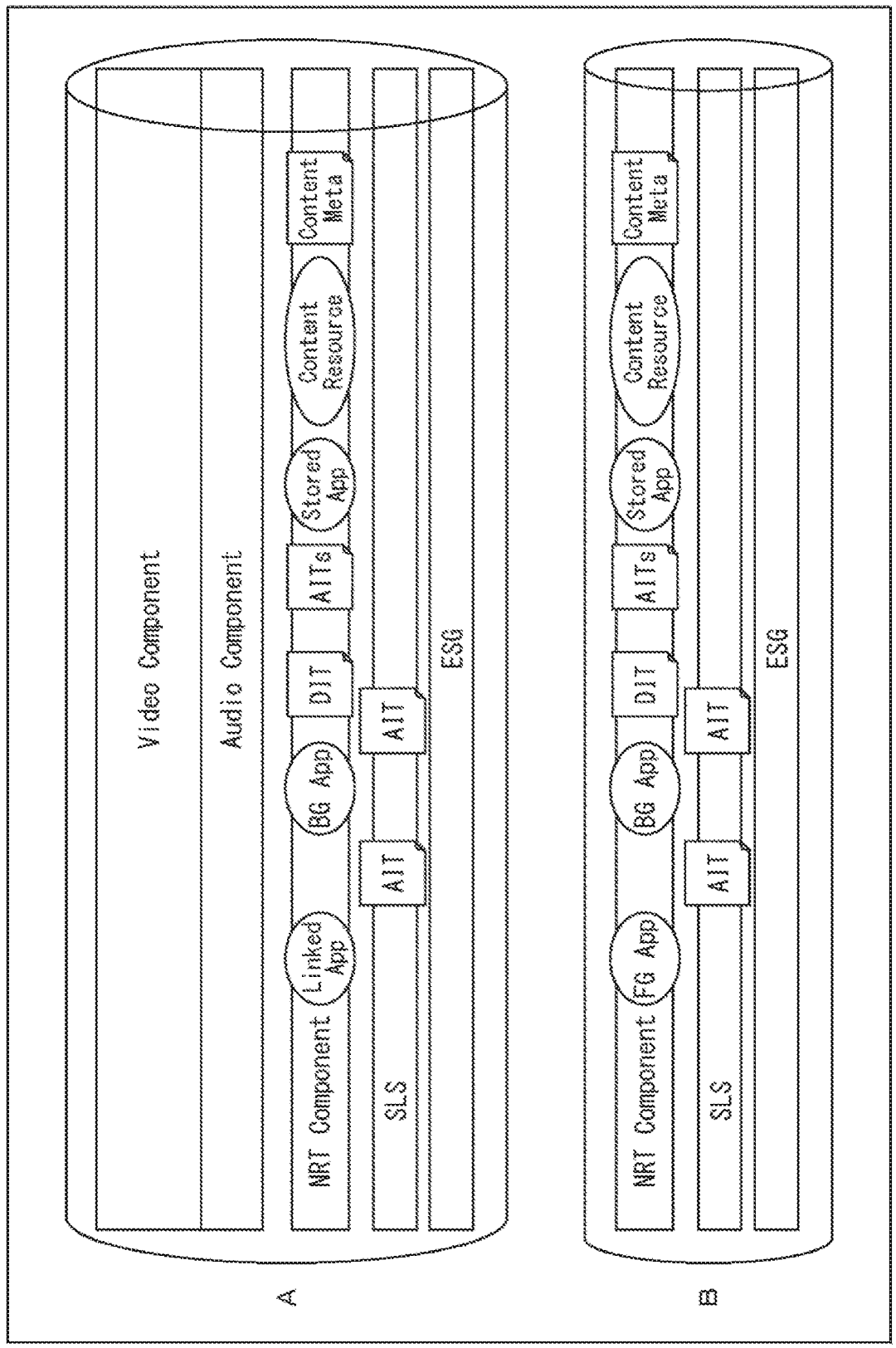

FIG. 14

| PROGRAM RESERVATION TUNING API (reserveTuningProgram) | | | |
|---|---|---|---|
| DESCRIPTION | RESERVES TUNING OPERATION OF SPECIFIED action_type | | |
| ARGUMENT | param | broadcast_stream_id | IDENTIFIER OF RF BAND TO BE SELECTED |
| | | service_id | IDENTIFIER OF SERVICE TO BE SELECTED |
| | | reservation_start_time | TUNING START TIME (option) |
| | | reservation_duration | TUNING DURATION (option) |
| | | schedule_fragment_uri | PROGRAM ID TO BE RESERVED (option) |
| | | action_type | 1. NORMAL TUNING, REPRODUCE, AND DISPLAY<br>2. TUNING AND REPRODUCE IN THE BACKGROUND (NO DISPLAY)<br>3. RECORD |

FIG. 15

| NRT DOWNLOAD API (NRTDownloadExecute) | | |
|---|---|---|
| DESCRIPTION | ACQUIRES A SPECIFIC FILE (GROUP) TRANSPORTED BY NRT SERVICE BEING RECEIVED AND ACCUMULATES IN STORAGE | |
| ARGUMENT | param | dit_uri | URI FROM WHICH DOWNLOAD CONTROL METAFILE (DIT) IS ACQUIRED |

FIG. 16

| APPLICATION TRANSITION API (replaceApplication) | | | |
|---|---|---|---|
| DESCRIPTION | TERMINATES BROADCASTING APPLICATION THAT EXECUTED THE METHOD AND STARTS BROADCASTING APPLICATION SPECIFIED BY ARGUMENT | | |
| ARGUMENT | param | organization_id | BROADCASTER ID OF BROADCASTING APPLICATION TO BE STARTED |
| | | application_id | APPLICATION ID OF BROADCASTING APPLICATION TO BE STARTED |
| | | ait_uri | URL INDICATING AIT LOCATION OR null |

FIG. 17

| API | DESCRIPTION |
|---|---|
| APPLICATION LIST ACQUISITION API | ACQUIRES A LIST OF STORED APPLICATIONS ACCUMULATED IN THE STORAGE |
| CONTENT LIST ACQUISITION API | ACQUIRES A LIST OF NRT CONTENT ACCUMULATED IN THE STORAGE |
| CONTENT INFORMATION ACQUISITION API | ACQUIRES INFORMATION INCLUDED IN METADATA OF NRT CONTENT ACCUMULATED IN THE STORAGE |
| CONTENT REPRODUCTION API | REPRODUCES NRT CONTENT ACCUMULATED IN THE STORAGE |
| SERIES RESERVATION TUNING API | RESERVES SERVICE TUNING OPERATION ON A SERIES-BY-SERIES BASIS |

FIG. 18

| Element/Attribute | Cardinality | data_type | Description |
|---|---|---|---|
| DIT | | | |
| @dl_id | 1 | unsigned Short | DOWNLOAD ID |
| @dl_version | 0..1 | unsigned Short | VERSION FOR SAME DOWNLOAD ID |
| @app_included | 1 | boolean | 0: not included (raw content) 1: included (app content) |
| @app_type | 1 | string | APPLICATION TYPE "std": STANDARD BROADCASTING APPLICATION ACTIVATED IN AIT "android", "ios", ...: OTHER APPLICATIONS |
| @organization_id | 1 | unsigned integer | BROADCASTER ID |
| @application_id | 1 | unsigned integer | APPLICATION ID |
| @app_version | 0..1 | unsigned Short | APPLICATION VERSION |
| @expire | 0..1 | dateTime | EXPIRATION DATE |
| @baseURI | 0..1 | anyURI | REFERENCE URI BASE WITHIN STORAGE |
| content_item | 1..n | | FILE TO BE DOWNLOADED |
| @item_path | 1 | string | FILE URI OR FILE path FOLLOWING baseURI |
| @item_type | 1 | string | FILE TYPE |
| @item_version | 0..1 | unsigned Short | FILE VERSION |
| @expire | 0..1 | dateTime | EXPIRATION DATE |
| @essential | 0..1 | boolean | DOWNLOAD MANDATORY FLAG 0: NOT NEEDED WHEN APPROPRIATE APPLICATION EXISTS |

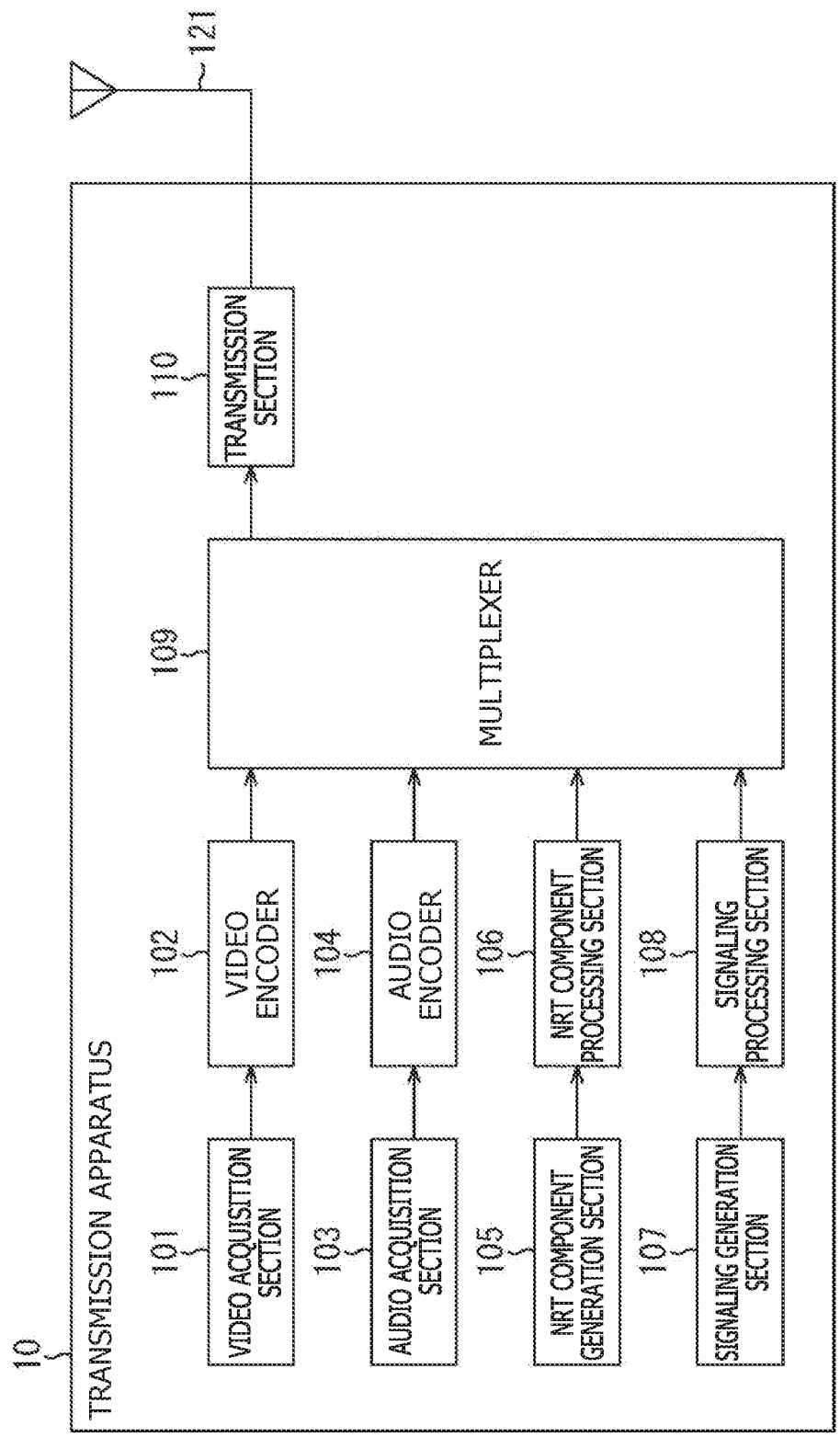

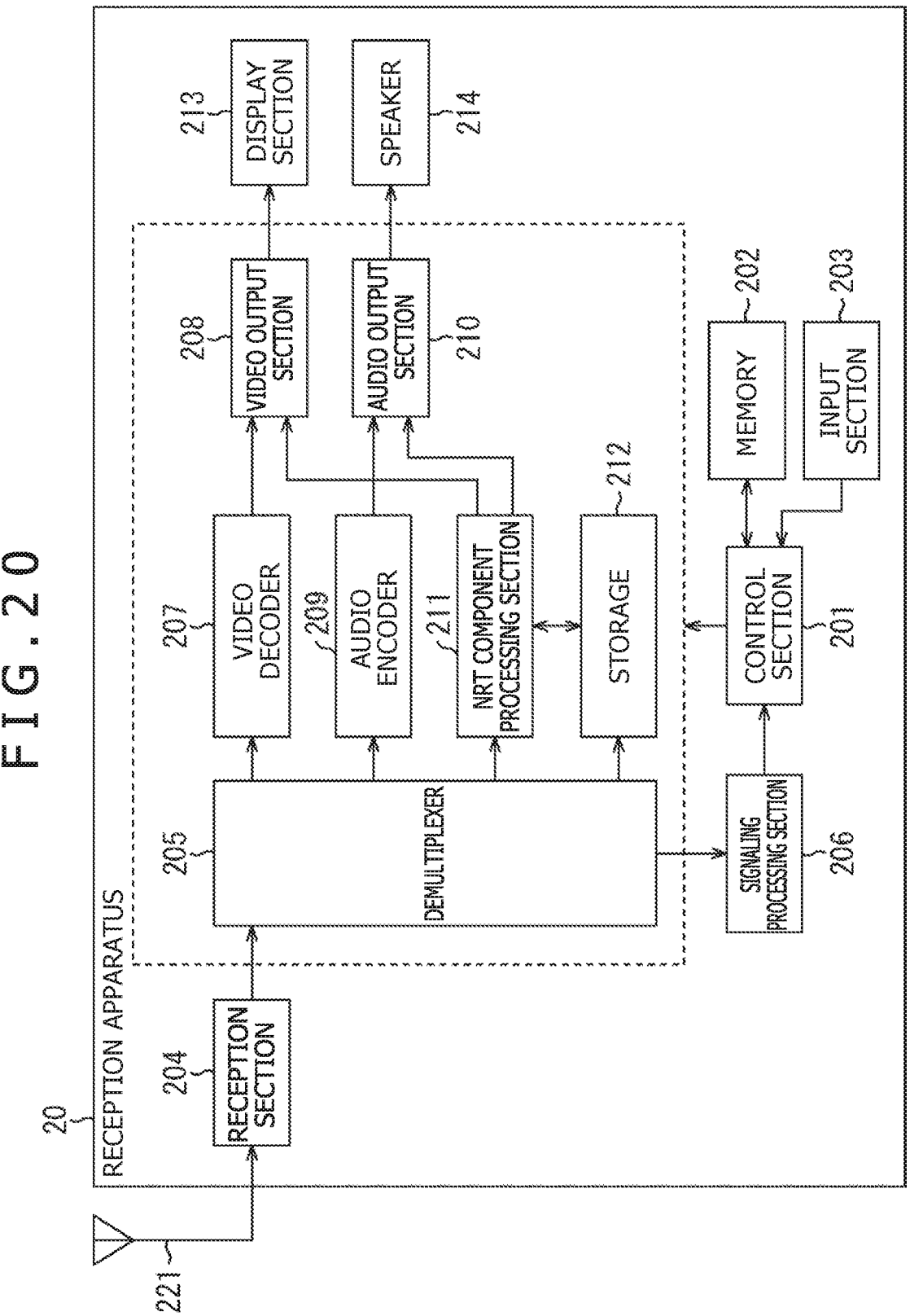

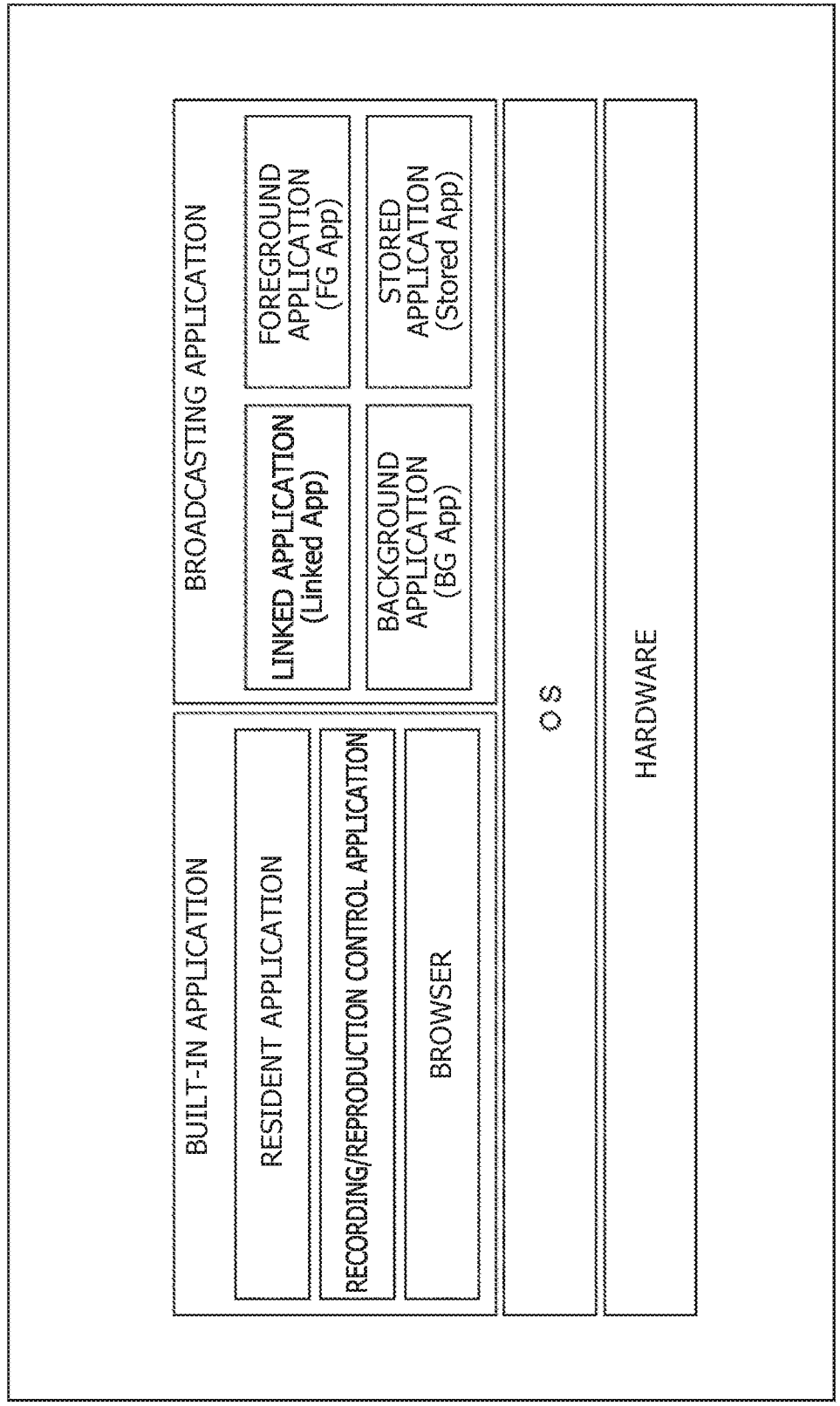

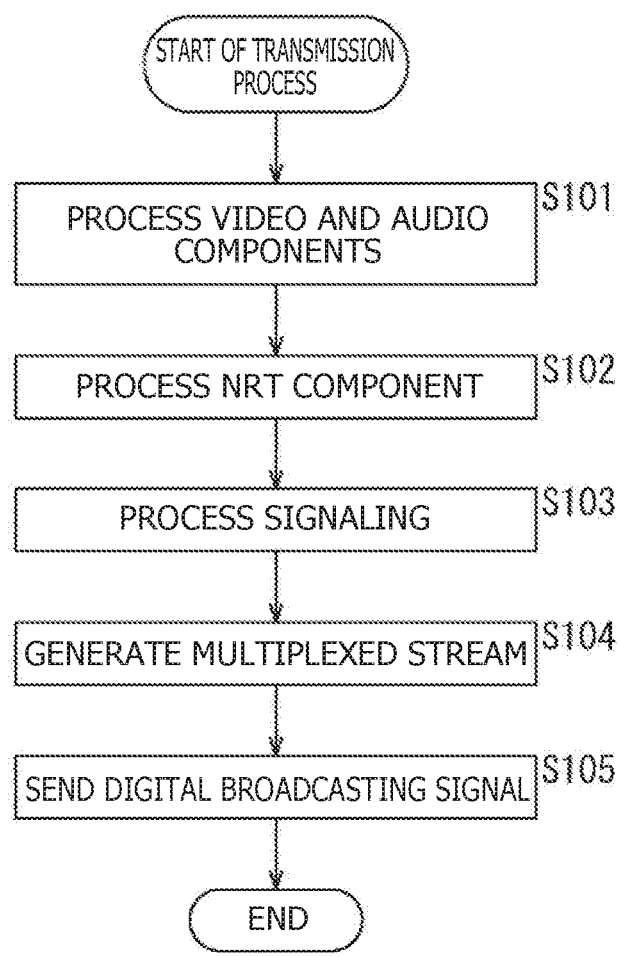

RECEPTION APPARATUS, TRANSMISSION APPARATUS, AND DATA PROCESSING METHOD

CROSS-REFERENCE TO RELATED APPLICATIONS

This application is continuation of U.S. application Ser. No. 15/761,611, filed on Mar. 20, 2018, which is a National Stage Entry under 35 U.S.C. § 371 of PCT/JP2016/077788, filed on Sep. 21, 2016, which claims priority to Japanese Patent Application No. 2015-197391, filed on Oct. 5, 2015. The entire content and disclosure of each of the foregoing applications is incorporated herein by reference.

TECHNICAL FIELD

The present technology relates to a reception apparatus, a transmission apparatus, and a data processing method, and more particularly, to a reception apparatus, a transmission apparatus, and a data processing method that permit downloaded reproduction of non-realtime content by reducing load associated with implementing resident applications.

BACKGROUND ART

In the field of broadcasting, a technology called NRT (Non Real Time) services is known (refer, for example, to NPL 1). In NRT services, download of NRT content sent from a broadcasting station (transmission apparatus thereof) takes place in a reception apparatus in response to reservation for accumulating non-realtime content (NRT content), after which the accumulated NRT content is reproduced.

CITATION LIST

Non Patent Literature

[NPL 1]
ATSC Standard Non-Real-Time Content Delivery (A/103:2014)

SUMMARY

Technical Problem

Incidentally, in the case of operation where downloaded reproduction of NRT content takes place in a reception apparatus as with NRT services, implementation of resident applications built into the reception apparatus may involve a significant load. For this reason, a proposal has been requested that permits downloaded reproduction of NRT content by reducing load associated with implementing resident applications if such operation is applied.

The present technology has been devised in light of the above circumstances, and it is an object of the present technology to permit downloaded reproduction of non-realtime content by reducing load associated with implementing resident applications if such operation is applied.

Solution to Problem

A reception apparatus of a first aspect of the present technology is a reception apparatus that includes a reception section, a first acquisition section, a second acquisition section, and a control section. The reception section receives a digital broadcast signal. The first acquisition section acquires a first application, included in the digital broadcast signal, that handles a download of content reproduced in non-realtime. The second acquisition section acquires metadata, included in the digital broadcast signal, that includes information for controlling the content download in response to operation of the first application. The control section handles the download of the content included in the digital broadcast signal by controlling the operation of the first application on the basis of the metadata.

The reception apparatus of the first aspect of the present technology may be a separate apparatus or an internal block making up a single apparatus. Also, a data processing method of the first aspect of the present technology is a data processing method associated with the reception apparatus of the first aspect of the present technology described above.

In the reception apparatus and the data processing method of the first aspect of the present technology, a digital broadcast signal is received, a first application is acquired that is included in the digital broadcast signal and that handles a download of content reproduced in non-realtime, metadata is acquired that is included in the digital broadcast signal and that includes information for controlling the content download in response to operation of the first application, and the download of the content included in the digital broadcast signal is handled by controlling the operation of the first application on the basis of the metadata.

A transmission apparatus of a second aspect of the present technology is a transmission apparatus that includes a first generation section, a second generation section, and a transmission section. The first generation section generates metadata that includes information for controlling a download of content reproduced in non-realtime. The second generation section generates a first application that handles the content download. The transmission section sends the metadata and the first application included in a digital broadcast signal.

The transmission apparatus of the second aspect of the present technology may be a separate apparatus or an internal block making up a single apparatus. Also, a data processing method of the second aspect of the present technology is a data processing method associated with the transmission apparatus of the second aspect of the present technology described above.

In the transmission apparatus and the data processing method of the second aspect of the present technology, metadata is generated that includes information for controlling a download of content reproduced in non-realtime, a first application is generated that handles the content download, and the metadata and the first application are sent included in a digital broadcast signal.

Advantageous Effects of Invention

According to first and second aspects of the present technology, non-realtime content can be downloaded and reproduced by reducing load associated with implementing resident applications.

It should be noted that the effect described herein is not necessarily limited and may be any one of the effects described in the present disclosure.

BRIEF DESCRIPTION OF DRAWINGS

FIG. 4 is a diagram describing an overview of NRT services of the present technology.

FIGS. 13A and 13B are diagrams illustrating another example of a scenario of an NRT service.

FIG. 14 is a diagram illustrating an example of a program reservation tuning API.

FIG. 15 is a diagram illustrating an example of an NRT download API.

FIG. 16 is a diagram illustrating an example of an application switching API.

FIG. 17 is a diagram illustrating examples of other APIs.

FIG. 18 is a diagram illustrating an example of DIT syntax.

FIG. 19 is a diagram illustrating a configuration example of a transmission apparatus.

FIG. 20 is a diagram illustrating a configuration example of a reception apparatus.

FIG. 21 is a diagram illustrating an example of software and hardware hierarchical structures in the reception apparatus.

FIG. 22 is a flowchart describing a flow of a transmission process.

DESCRIPTION OF EMBODIMENT

A description will be given below of modes for carrying out the present technology with reference to diagrams. It should be noted that a description will be given in the following order:
1. System Configuration
2. Overview of Digital Broadcasting by IP Transport Scheme
3. Examples of Operation of NRT Services
(1) NRT Embedded TV Service
(2) Foreground NRT Service
(3) Background NRT Service
(3-1) APP Data Type
(3-2) RAW Data Type
4. Example of API Used in NRT Service
5. Example of Syntax
6. Configuration of Each Apparatus
7. Flow of Processes Performed in Each Apparatus
8. Modification Example
9. Configuration of the Computer 1. System Configuration (Configuration Example of the Transport System)

Figure 1:
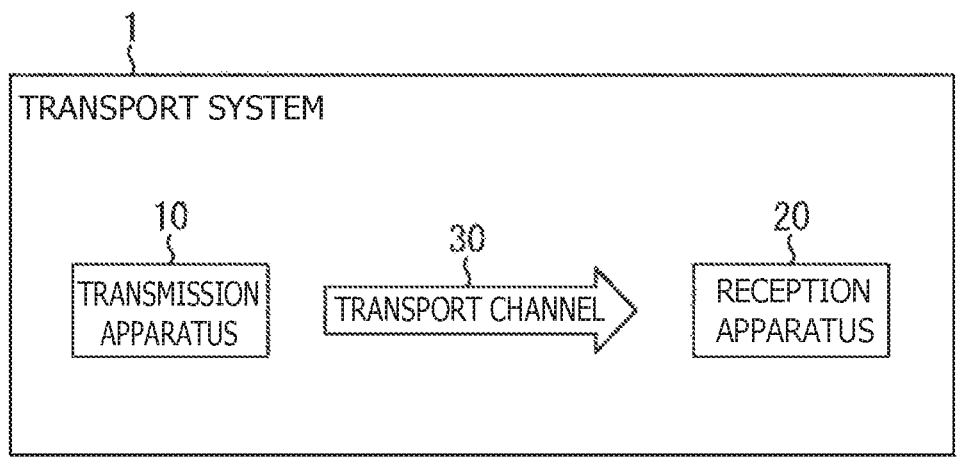
FIG. 1 is a diagram illustrating a configuration of an embodiment of a transport system to which the present technology is applied.

FIG. 1 is a diagram illustrating a configuration of an embodiment of a transport system to which the present technology is applied. It should be noted that a system refers to a logical set of a plurality of apparatuses.

In FIG. 1, a transport system 1 includes a transmission apparatus 10 and a reception apparatus 20. In this transport system 1, data transport compliant with a digital broadcasting standard using ATSC (Advanced Television Systems Committee) 3.0 and so on takes place. It should be noted that ATSC3.0 is a next generation broadcasting standard of ATSC, a broadcasting standard employed in US and other countries.

The transmission apparatus 10 sends a broadcast stream including broadcast content such as TV programs using a digital broadcast signal via a transport channel 30. Also, the transmission apparatus 10 can send non-realtime NRT (Non Real Time) content included in a broadcast stream.

The reception apparatus 20 receives a digital broadcast signal sent from the transmission apparatus 10 via the transport channel 30, processes broadcast content included in a broadcast stream, and outputs broadcast content image and sound of TV programs and so on. Also, the reception apparatus 20 can accumulate NRT content included in broadcast streams and reproduce accumulated NRT content (downloaded reproduction).

It should be noted that although, in the transport system 1 depicted in FIG. 1, only one reception apparatus 20 is illustrated for simpler description, the plurality of reception apparatuses 20 can be provided, and the digital broadcast signal sent by the transmission apparatus 10 can be received simultaneously by the plurality of reception apparatuses 20 via the transport channel 30.

Also, the plurality of transmission apparatuses 10 can be provided. Each of the plurality of transmission apparatuses 10 can send a digital broadcast signal including a broadcast stream, for example, in a separate frequency band as a separate channel, and the reception apparatus 20 can select a channel for receiving the broadcast stream from among the respective channels of the plurality of transmission apparatuses 10.

Further, in the transport system 1 depicted in FIG. 1, the transport channel 30 may be not only terrestrial broadcasting but also, for example, satellite broadcasting using a broadcasting satellite (BS) or communications satellite (CS) and wired broadcasting using cables (CATV).

2. Overview of Digital Broadcasting by IP Transport Scheme

Incidentally, the MPEG2-TS (Moving Picture Experts Group phase 2-Transport Stream) scheme has been employed as a transport scheme in various countries as a digital broadcasting standard. It is assumed, however, that more advanced services will be provided by introducing a scheme using IP (Internet Protocol) packet, used in the field of communication, for digital broadcasting (hereinafter referred to as IP transport scheme) in the future.

In ATSC 3.0 whose standardization is advancing, it has been decided that the IP transport scheme will be employed. Also, expectations are high that an IP transport scheme will be employed not only in ATSC 3.0 but also in other broadcasting schemes in the future.

In ATSC 3.0, IP/UDP packet, i.e., IP (Internet Protocol) packet including UDP (User Datagram Protocol) packet, is used for data transport. Also, in ATSC 3.0, ROUTE (Real-Time Object Delivery over Unidirectional Transport) and MMT (MPEG Media Transport) coexist as transport protocols, and video, audio, and subtitle (and its component) streams are transported by using one of these transport protocols.

Here, ROUTE is an extended protocol of FLUTE (File Delivery over Unidirectional Transport), a protocol suited for multicasting binary files unidirectionally. Also, MMT is a transport scheme used on the IP (Internet Protocol) that allows for referring to video, audio, and other data by specifying an IP address or URL (Uniform Resource Locator) using control information.

Further, ATSC 3.0 assumes that LLS (Link Layer Signaling) signaling and SLS (Service Layer Signaling) signaling will be defined as signaling, and SLS signaling for each service will be acquired in accordance with information described in LLS signaling that is acquired first.

Here, metadata such as SLT (Service List Table) is included as LLS signaling. SLT includes information indicating stream and service configurations in the broadcasting network such as information required for service tuning (tuning information).

Also, metadata such as USD (User Service Description), LSID (LCT Session Instance Description), MPD (Media Presentation Description), and AIT (Application Information Table) is included as SLS signaling. USD includes information such as sources of acquisition of other metadata. LSID is control information of ROUTE protocol. MPD is control information for managing reproduction of component stream. ALI is control information of application. For example, AIT includes information for managing application's life cycle.

It should be noted that metadata such as USD, LSID, MPD, and AIT is described using a markup language such as XML (Extensible Markup Language). Also, MPD is compliant with MPEG-DASH (Dynamic Adaptive Streaming over HTTP).

Also, signaling other than LLS signaling and SLS signaling may be transported. Metadata such as DIT (Download Information Table) including information for controlling NRT content download can be defined as such signaling. It should be noted that, although described in detail later, DIT metadata is transported as an NRT component.

(Protocol Stack)

Figure 2:
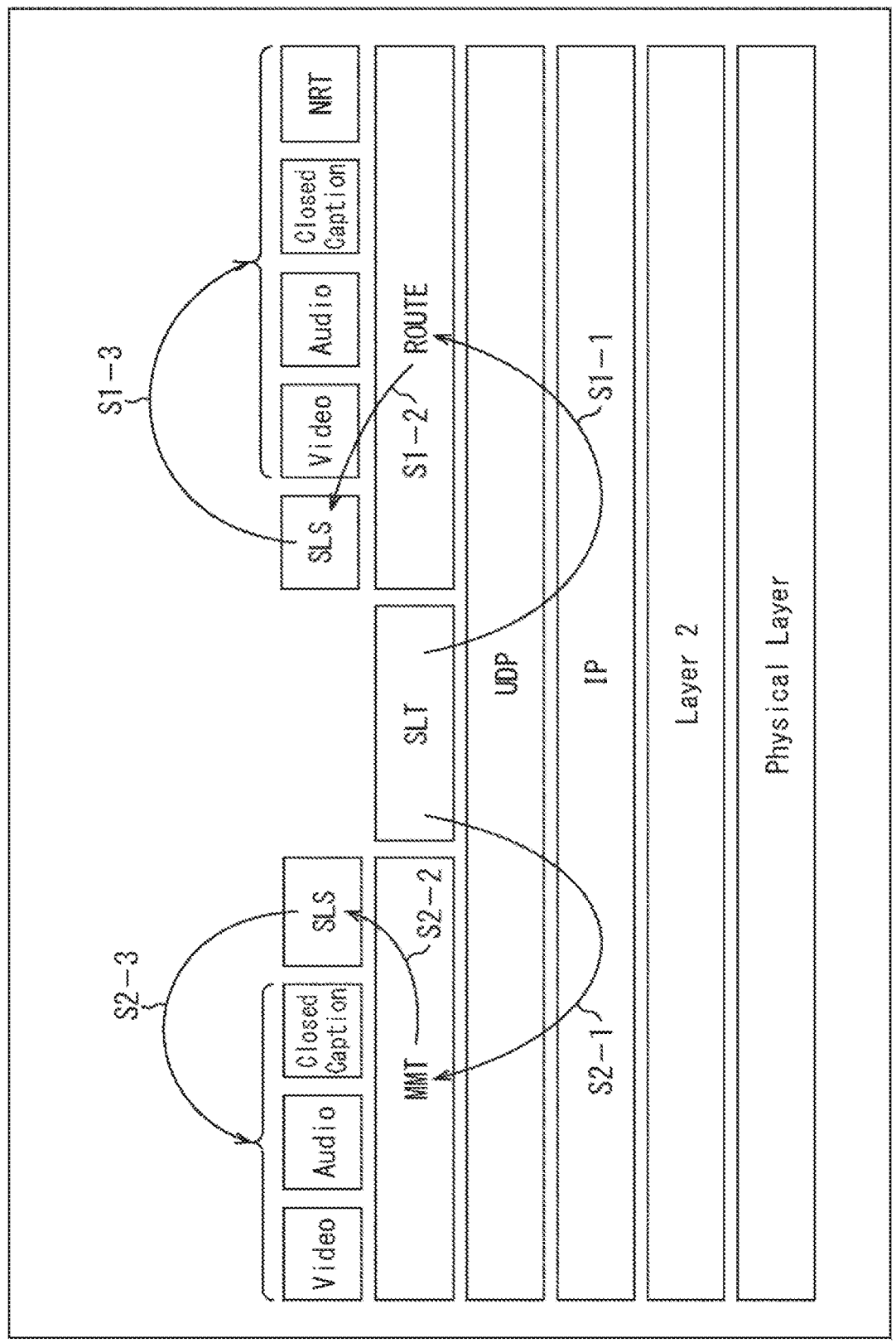
FIG. 2 is a diagram illustrating a protocol stack of an IP transport scheme to which the present technology is applied.

FIG. 2 is a diagram illustrating a protocol stack of an IP transport scheme to which the present technology is applied.

In FIG. 2, the lowermost layer is a physical layer (Physical Layer). An upper layer adjacent to the physical layer is a layer 2 (Layer 2). Further, an upper layer adjacent to the layer 2 is an IP layer. Also, an upper layer adjacent to the IP layer is a UDP layer. That is, an IP packet including a UDP packet (IP/UDP packet) is placed in the payload of a layer 2 generic packet and encapsulated. Also, a physical layer frame (Physical Frame) includes a preamble and a data portion. Data mapped into the data portion is data obtained by adding an error correction parity to a BB frame, obtained by encapsulating a plurality of generic packets, and then performing a process for physical layer such as interleaving and mapping.

Upper layers of the UDP layer are ROUTE, MMT, and SLT. That is, video, audio, and subtitle (and its component) streams, SLS signaling streams, and NRT component streams, transported over ROUTE sessions, are placed into IP/UDP packets and transported. It should be noted that NRT components include broadcast applications, NRT content, and so on. NRT content is accumulated once in the storage of the reception apparatus 20 and then reproduced (downloaded and reproduced).

On the other hand, video, audio, and subtitle streams and SLS signaling streams, transported by MMT sessions, are placed into IP/UDP packets and transported. Also, SLT is placed into an IP/UDP packet and transported.

Because the protocol stack as described above is used, the reception apparatus 20 acquires SLS signaling (S1-1, S1-2) transported over a ROUTE session in accordance with tuning information included in SLT during tuning to a service (channel) provided by a component stream transported over a ROUTE session. Then, the reception apparatus 20 connects to a component stream that provides the service tuned to in accordance with the metadata such as USD, LSID and MPD (S1-3). As a result, the broadcast content (e.g., TV program) image and sound for the service tuned to is output in the reception apparatus 20.

Also, the reception apparatus 20 acquires SLS signaling (S2-1, S2-2) transported over an MMT session in accordance with tuning information included in SLT during tuning to a service (channel) provided by a component stream transported over an MMT session. Then, the reception apparatus 20 connects to a component stream that provides the service tuned to in accordance with various kinds of metadata included in the SLS signaling (S2-3). As a result, the image and sound of broadcast content (e.g., TV program) for the service tuned to is output in the reception apparatus 20.

3. Examples of Operation of NRT Services (NRT Services)

Figure 3:
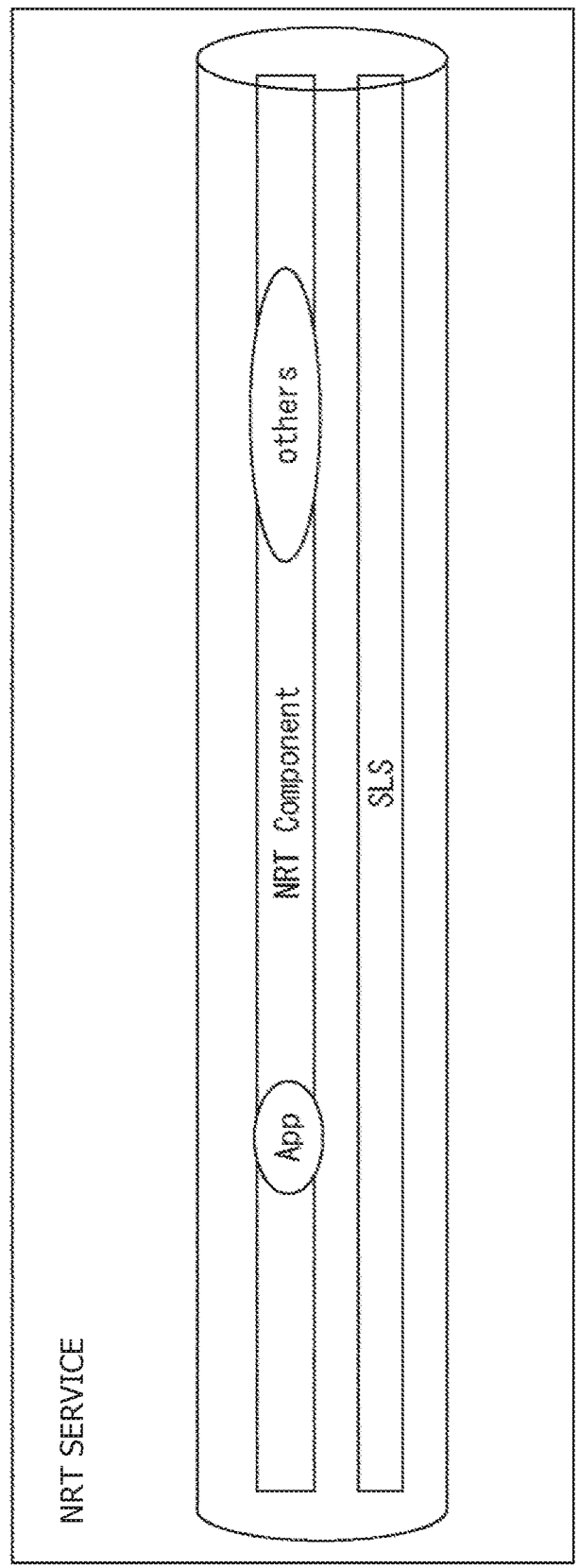
FIG. 3 is a diagram describing an overview of ordinary NRT services.

FIG. 3 is a diagram describing an overview of ordinary NRT services.

NRT service is a service in which the reception apparatus 20 accumulates non-realtime NRT content (NRT component) downloaded and distributed from the transmission apparatus 10 via the transport channel 30 in the storage once and then reproduces the content (downloaded reproduction).

Here, ATSC 3.0 assumes that, when an NRT service is provided, a broadcast application ("App" in the figure) is delivered as an NRT component. This broadcast application file is transported over a ROUTE session together with SLS signaling and other files ("Others" in the figure). Also, a broadcast application can refer to other files.

Hereinafter, a description will be given of NRT services premised on delivery of a broadcast application as an NRT component as NRT services of the present technology.

(NRT Services of the Present Technology)

FIG. 4 is a diagram describing an overview of NRT services of the present technology.

NRT services of the present technology can be broadly classified into NRT embedded TV service (NRT embedded TV Service), foreground NRT service (Foreground NRT Service), and background NRT service (Background NRT Service). Also, background NRT service includes two kinds of data types, APP data type and RAW data type.

NRT embedded TV service is a service that executes a linked application (Linked App), transported as an NRT component, in a linked manner with broadcast content (e.g., TV program). Here, a linked application (Linked App) is an application that is executed in a linked manner with broadcast content.

Foreground NRT service is a service that displays a portal (portal page) using a foreground application (FG App) transported as an NRT component. Here, it can be said that a foreground application (FG App) is an application of which the user is aware because a foreground application displays a portal (portal page) image over the entire screen.

Background NRT service is a service that downloads NRT content transported as an NRT component in response to NRT service (NRT content) reservation tuning using a background application (BG App) transported as an NRT component.

Here, background application (BG App) is an application that handles NRT content download. Also, background application (BG App) is an application that runs in the background. This application is not displayed because only processing details are described using scripts and so on. Therefore, an NRT content download process is conducted without the user being aware of the running of the background application (BG App).

Also, in the case of background NRT service of APP data type, target file group (Stored App, AITs) data and its reference file group (Content Meta, Content Resource) data are transported. In the reception apparatus 20, therefore, target file group (Stored App, AITs) data and its reference file group (Content Meta, Content Resource) data are accumulated in the storage.

Here, the target file group includes a stored application (Stored App) and AITs. The stored application (Stored App) processes reference file group data. AITs (Application Information Table Storage) are control information of the stored application (Stored App).

The reference file group includes content metadata (Content Meta) and a content resource (Content Resource). The content resource is a data substance of NRT content such as movie and music, and the content metadata is metadata of NRT content.

In the case of background NRT service of RAW data type, only reference file group (Content Meta, Content Resource) data is transported. In the reception apparatus 20, therefore, reference file group (Content Meta, Content Resource) data is accumulated in the storage. In this case, an external application processes the reference file group data.

Here, an external application is an application other than the stored application (Stored App) included in the target file group transported together with the reference file group such as linked application (Linked App), foreground application (FG App), and other stored application (Stored App).

It should be noted that linked application (Linked App), foreground application (FG App), background application (BG App), and stored application (Stored App) are developed using a markup language such as HTML5 (HyperText Markup Language 5). Also, NRT content is non-realtime content. On the other hand, broadcast content is realtime content.

Also, in the reception apparatus 20, in addition to applications related to these NRT services, built-in applications such as resident application (RA), browser, and recording/reproduction control application are also executed. It should be noted that a resident application (RA) is an application that is built into the reception apparatus 20 in advance.

In the description given below, if it is not necessary for linked application (Linked App), foreground application (FG App), background application (BG App), and stored application (Stored App) to be distinguished, they will be referred to as broadcast applications (BCA) for distinction from built-in applications such as resident application (RA).

Figure 5:
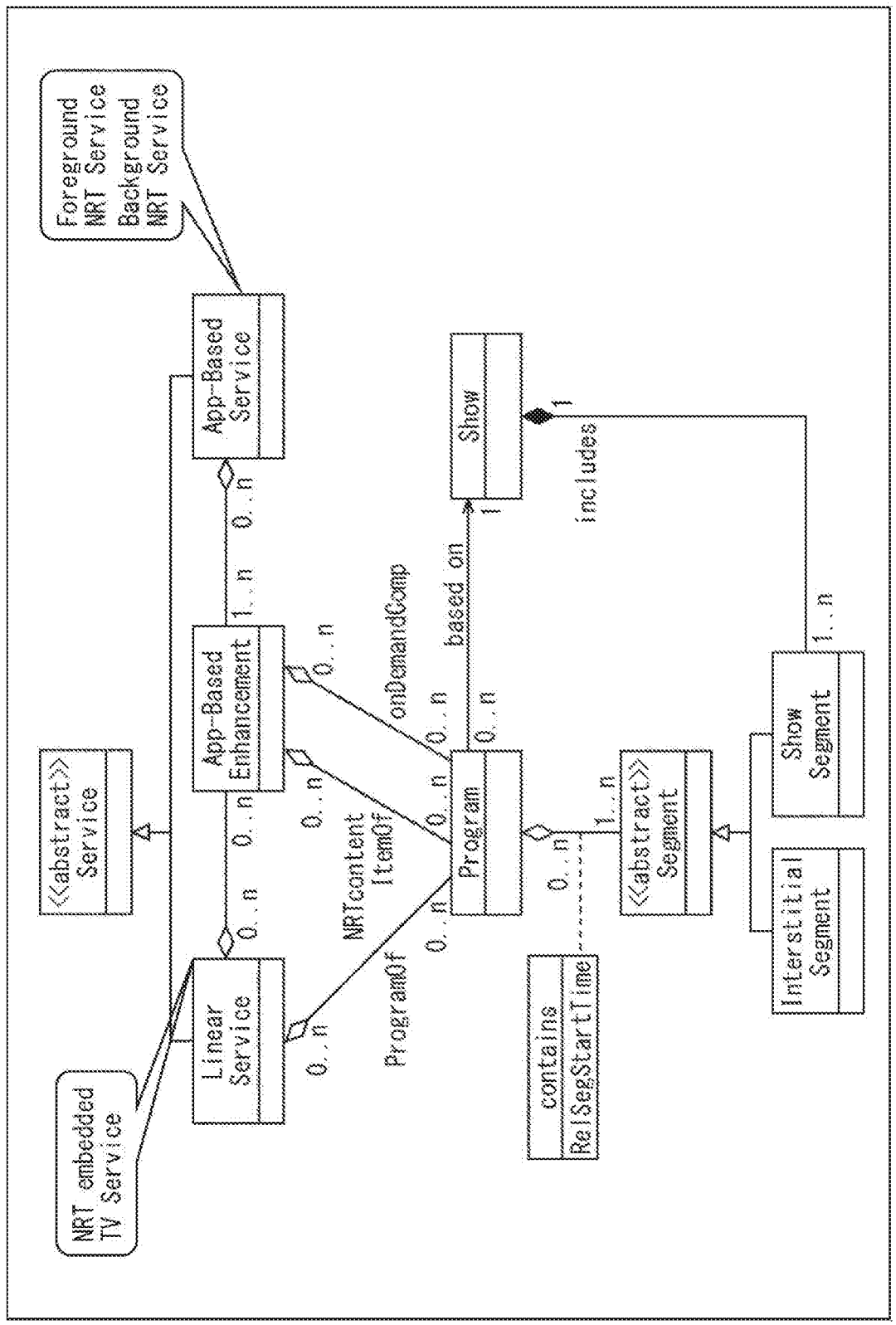
FIG. 5 is a diagram illustrating a conceptual model of NRT services of the present technology.

It should be noted that FIG. 5 illustrates a conceptual model of NRT embedded TV service (NRT Embedded TV Service), foreground NRT service (Foreground NRT Service), and background NRT service (Background NRT Sercvice), NRT services of the present technology.

(1) NRT Embedded TV Service

Figure 6:
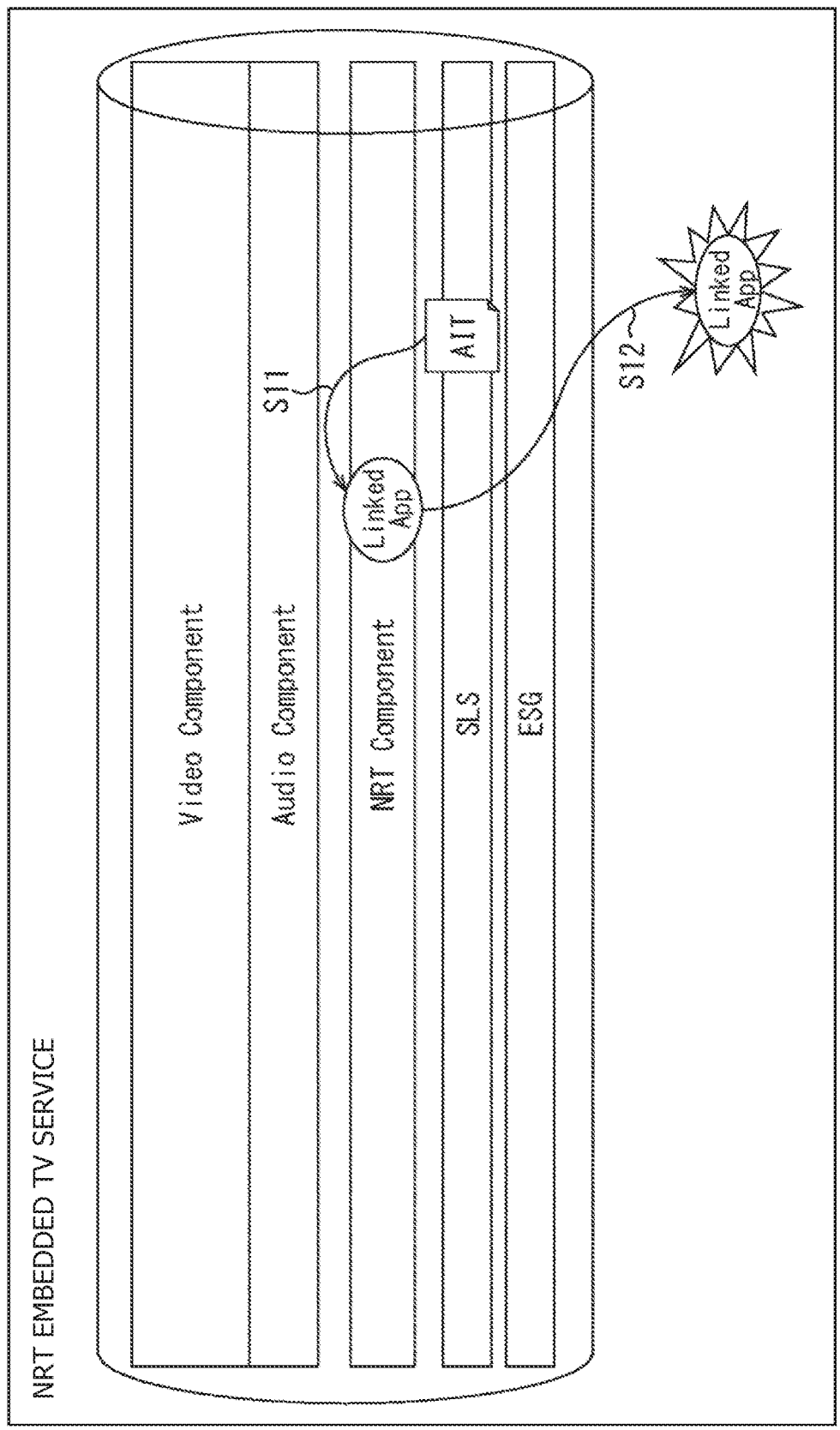
FIG. 6 is a diagram illustrating an example of a scenario of an NRT embedded TV service.

FIG. 6 is a diagram illustrating an example of a scenario of an NRT embedded TV service.

In FIG. 6, a broadcast stream includes video component, audio component, NRT component, SLS signaling, and ESG (Electronic Service Guide) service streams. It should be noted that although not depicted in the broadcast stream depicted in FIG. 6 for simpler description, other streams such as LLS signaling may be included.

When such a broadcast stream is transported from the transmission apparatus 10 to the reception apparatus 20 via the transport channel 30, an NRT embedded TV service provided in the reception apparatus 20 is realized as described below.

That is, in the reception apparatus 20, broadcast content such as TV program is reproduced as video and audio component streams are received and processed in response to user tuning operation. As a result, in the reception apparatus 20, a broadcast content image is displayed on the display section, and a sound synchronous with the image is output from the speaker.

Also, when an AIT for controlling the operation of a linked application (Linked App) is received in the reception apparatus 20 as SLS signaling, the linked application (Linked App) transported as an NRT component is acquired in accordance with the AIT (S11). Then, the linked application (Linked App) is started in the reception apparatus 20 in accordance with the AIT (S12).

Thus, in the reception apparatus 20, the linked application (Linked App) is executed in a linked manner with broadcast content such as TV program, and an image of the linked application (Linked App) is displayed together with an image of the broadcast content.

(2) Foreground NRT Service

Figure 7:
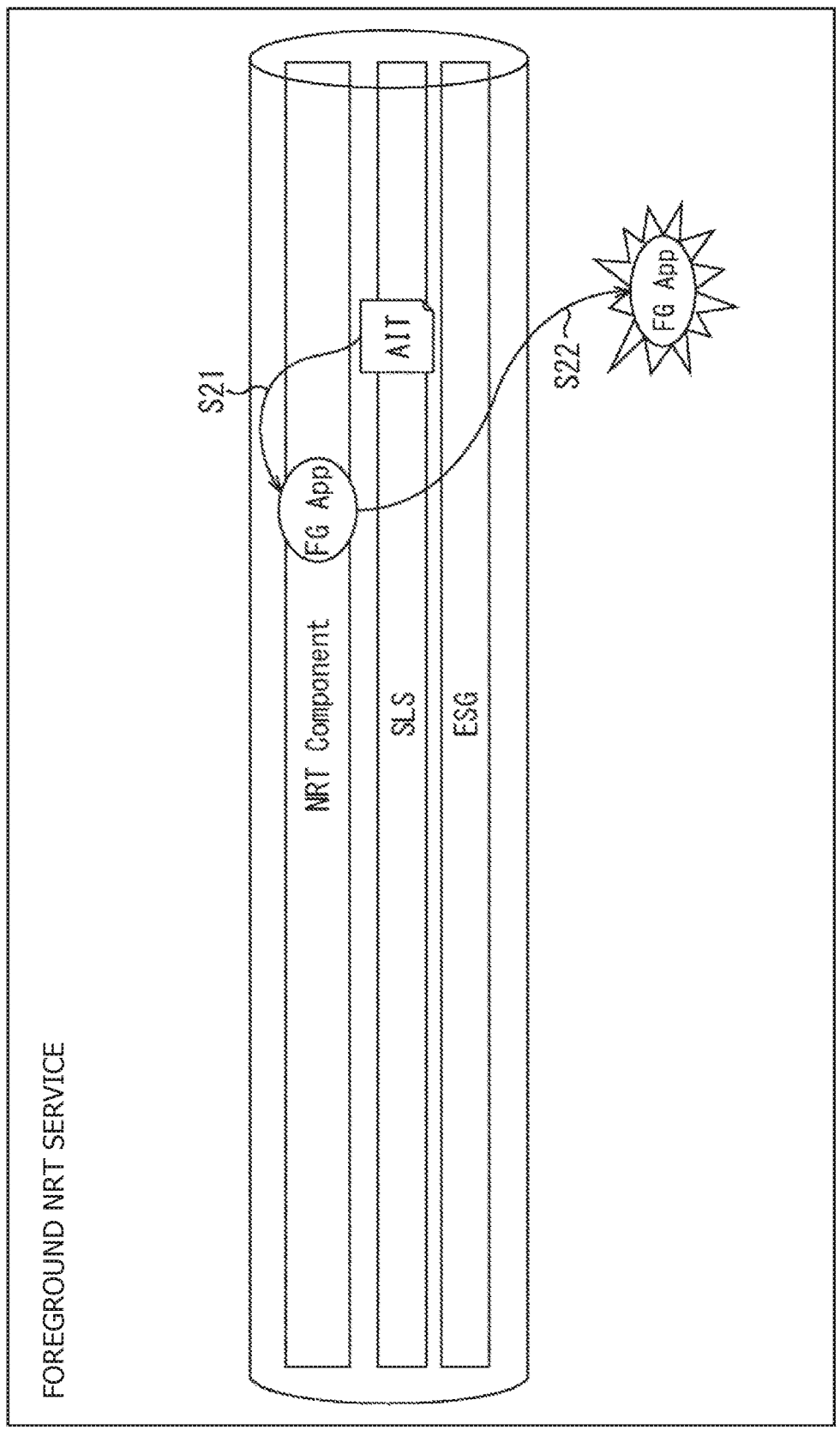
FIG. 7 is a diagram illustrating an example of a scenario of a foreground NRT service.

FIG. 7 is a diagram illustrating an example of a scenario of a foreground NRT service.

In FIG. 7, a broadcast stream includes NRT component, SLS signaling, and ESG service streams. It should be noted that although not depicted in the broadcast stream depicted in FIG. 7 for simpler description, other streams such as LLS signaling may be included. Also, the NRT component stream is not limited to one stream, and a plurality of NRT component streams may be transported.

When such a broadcast stream is transported from the transmission apparatus 10 to the reception apparatus 20 via the transport channel 30, a foreground NRT service provided in the reception apparatus 20 is realized as described below.

That is, when an AIT for controlling the operation of a foreground application (FG App) is received in the reception apparatus 20 in response to user tuning operation (portal display instruction), the foreground application (FG App) transported as an NRT component is acquired in accordance with the AIT (S21). Then, the foreground application (FG App) is started in the reception apparatus 20 in accordance with the AIT (S22).

Thus, in the reception apparatus 20, the foreground application (FG App) is executed, and an image of a portal (portal page) for the foreground application (FG App) is displayed over the entire screen. That is, in a foreground NRT service, only a portal (portal page) image is displayed over the entire screen rather than an image of broadcast content such as TV program.

(3) Background NRT Service (3-1) APP Data Type (Example of Scenario)

Figure 8:
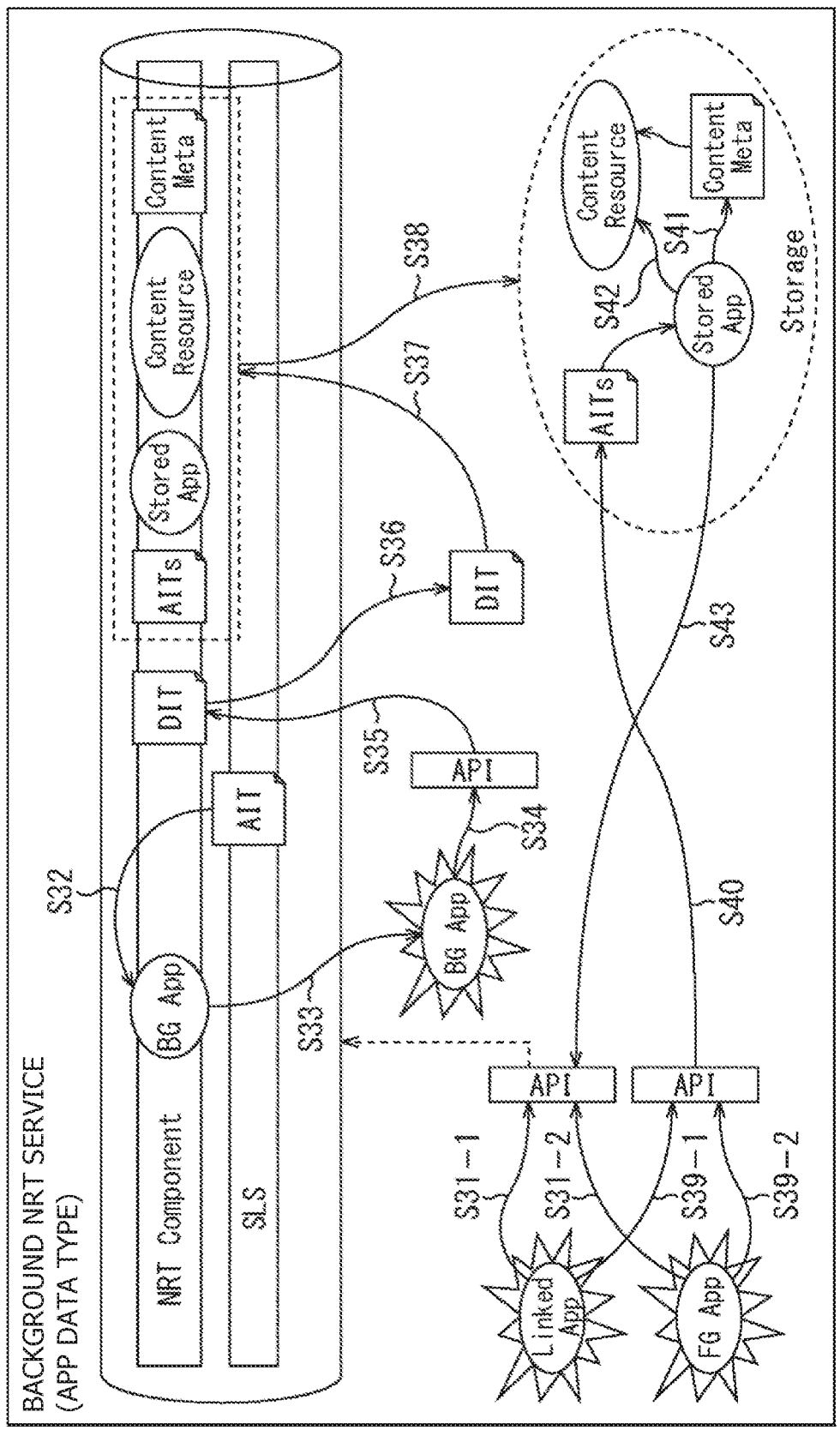
FIG. 8 is a diagram illustrating an example of a scenario of a background NRT service (APP data type).

FIG. 8 is a diagram illustrating an example of a scenario of a background NRT service of APP data type.

In FIG. 8, a broadcast stream includes NRT component and SLS signaling streams. However, although not depicted in the broadcast stream depicted in FIG. 8 for simpler description, other streams such as LLS signaling and ESG service may be included. Also, the NRT component stream is not limited to one stream, and a plurality of NRT component streams may be transported.

When such a broadcast stream is transported from the transmission apparatus 10 to the reception apparatus 20 via the transport channel 30, a background NRT service (APP data type) provided in the reception apparatus 20 is realized as described below.

That is, when a program reservation tuning API (Application Programming Interface) is executed by the linked application (Linked App) or the foreground application (FG App) in the reception apparatus 20, NRT service tuning operation is reserved (S31-1, S31-2). As a result, the reservation of accumulation target NRT content is completed. It should be noted that a series reservation tuning API may be executed in place of a program reservation tuning API so that NRT service tuning operation is reserved on a series-by-series basis rather than a program-by-program basis.

Thereafter, when the reservation execution time (reservation start time) of the program specified by the program reservation tuning API arrives, the corresponding NRT service is tuned to in the reception apparatus 20. When an AIT for controlling the operation of a background application (BG App) in the NRT service tuned to is received in the reception apparatus 20, a background application (BG App), transported as an NRT component, is acquired in accordance with the AIT (S32). Then, the background application (BG App) is started in the reception apparatus 20 in accordance with the AIT (S33).

At this time, the background application (BG App) is hidden because it is an application that runs in the background. Then, an NRT download API is executed by this background application (BG App) (S34).

In the reception apparatus 20, DIT metadata transported as an NRT component is acquired in response to execution of the NRT download API by the background application (BG App) (S35, S36). Then, the background application (BG App) acquires a target file group (Stored App, AITs) and its reference file group (Content Meta, Content Resource) (data thereof) transported as an NRT component on the basis of the DIT metadata acquired (S37, S38).

Here, the target file group includes a stored application (Stored App) and AITs, control information of the stored application. Also, the reference file group includes a content resource (Content Resource) and content metadata (Content Meta), metadata of the content resource (Content Resource).

Thus, in the reception apparatus 20, a target file group (Stored App, AITs) and a reference file group (Content Meta, Content Resource), acquired in response to DIT metadata, are accumulated in the storage ("Storage" illustrated by dotted line in the figure) by the hidden background application (BG App), that runs in the background. It should be noted that the storage (Storage) in FIG. 8 corresponds to a storage 212 of the reception apparatus 20 depicted in FIG. 20.

Thereafter, when the application list acquisition API is executed by the linked application (Linked App) or the foreground application (FG App) in the reception apparatus 20, a list of stored applications (Stored Apps) accumulated in the storage (Storage) is acquired and displayed (S39-1, S39-2). Then, for example, a stored application (Stored App) selected by the user from the list of the stored application (Stored App) is started in accordance with the AITs (S40).

Here, the stored application (Stored App) is, for example, a player for reproducing NRT content such as movie and music. Then, the stored application (Stored App) presents information associated with NRT content (content resource) such as movie and music (S41) and reproduces (downloads and reproduces) NRT content (content resource) on the basis of the content metadata (S42).

Also, as broadcast applications (BCAs) execute various APIs (APIs depicted in FIGS. 14 to 17 described later), various processes for such APIs are performed, one example of which is reservation of NRT service tuning operation by the stored application (Stored App) by executing the program reservation tuning API (S43).

That is, as broadcast applications (BCAs) perform processes for various APIs in the reception apparatus 20, the broadcast applications (BCAs) run in a so-called chain reaction manner. It should be noted that processes for various APIs performed by broadcast applications (BCAs) will be described in detail later with reference to FIG. 9.

Thus, when the reservation start time of NRT service tuning operation arrives in the reception apparatus 20, the reception of the applicable NRT service is started, acquiring a background application (BG App) in response to the AIT first and starting the execution of the hidden background application (BG App). As a result, stored applications (Stored Apps) and content resources (Content Resources) are accumulated in the storage (Storage) in response to DIT metadata. Then, in the reception apparatus 20, the stored applications (Stored Apps) accumulated in the storage run in response to various APIs, allowing processes related to NRT content to be performed.

As a result, in a background NRT service of APP data type, processes for downloading and reproducing NRT content are realized by implementing broadcast applications (BCAs) such as background applications (BG Apps) and stored applications (Stored Apps), thereby allowing for downloaded reproduction of NRT content by reducing load associated with implementing resident applications (RA).

(Example of a Process Performed by API)

Figure 9:
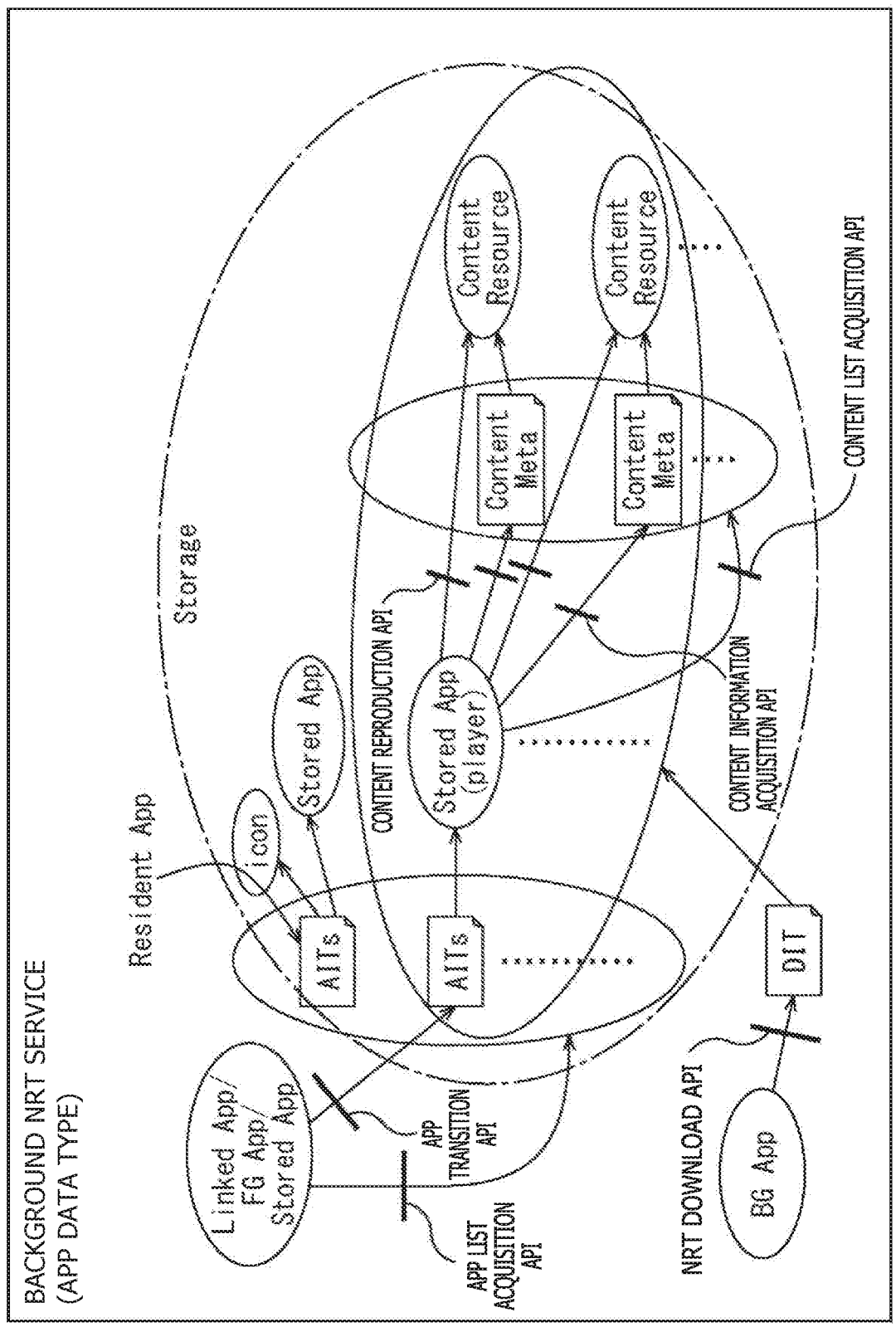
FIG. 9 is a diagram illustrating a relationship between applications and storage data in the background NRT service (APP data type).

FIG. 9 is a diagram illustrating a relationship between applications and storage data in the background NRT service of APP data type.

It should be noted, however, that we assume, in FIG. 9, that NRT service tuning operation has already been reserved as a result of execution of a program reservation tuning API or a series reservation tuning API by a linked application (Linked App) or a foreground application (FG App) in the reception apparatus 20. Also, the storage (Storage) enclosed by an ellipse illustrated by a long dashed short dashed line in FIG. 9 corresponds to the storage 212 of the reception apparatus 20 depicted in FIG. 20.

In FIG. 9, when the reservation start time of NRT service tuning operation arrives in the reception apparatus 20, a background application (BG App) acquired by tuning to the applicable NRT service is started hidden, and an NRT download API is executed by this background application (BG App). As a result, DIT metadata is acquired. Therefore, the background application (BG App) acquires a target file group and a reference file group (data thereof), transported as an NRT component, on the basis of the DIT metadata and accumulates the file groups in the storage (Storage).

As a result, the target file group and the reference file group (data thereof) are accumulated in the storage (Storage) of the reception apparatus 20. That is, a stored application (Stored App) as a target file group, AITs, control information of the stored application, a content resource (Content Resource) as a reference file group, and content metadata (Content Meta), metadata of the content resource (Content Resource), are accumulated in the storage (Storage). It should be noted that we assume that the storage (Storage) depicted in FIG. 9 stores not only the target file group and reference file group (data thereof) accumulated at the current time but also other data (target file group and reference file group data) that was already accumulated at the previous time.

Thereafter, when the application list acquisition API is executed by the linked application (Linked App), the foreground application (FG App), or the stored application (Stored App) in the reception apparatus 20, a list of stored applications (Stored Apps) accumulated in the storage (Storage) is generated and displayed on the basis of the one or plurality of AITs accumulated in the storage (Storage). As a result, for example, a stored application (Stored App) selected by the user from among the list of the stored application (Stored App) is started in accordance with the associated AITs.

Also, when an application switching API is executed by the linked application (Linked App), the foreground application (FG App), or the stored application (Stored App) in the reception apparatus 20, the stored application (Stored App) as a target of switching is started on the basis of the AITs associated with the switching target stored application (Stored App) among the one or plurality of AITs accumulated in the storage. As a result, the linked application (Linked App), the foreground application (FG App), or the stored application (Stored App) is switched over to the switching target stored application (Stored App).

The stored application (Stored App) is, for example, a player (player) for reproducing NRT content such as movie and music.

When a content list acquisition API is executed by the stored application (Stored App), a list of NRT content (content resources (Content Resources)) accumulated in the storage is generated and displayed on the basis of the one or plurality of pieces of content metadata (Content Meta) accumulated in the storage (Storage). As a result, for example, a piece of NRT content (content resources (Content Resources)) such as movie or music selected by the user from the NRT content list is reproduced.

Also, when a content information acquisition API is executed by the stored application (Stored App), information associated with NRT content (content information) is displayed on the basis of the target content metadata (Content Meta) to be acquired among the one or plurality of pieces of content metadata (Content Meta) accumulated in the storage (Storage). As a result, for example, when the user issues an instruction to reproduce the NRT content whose content information is displayed, the reproduction of the NRT content (content resources (Content Resources)) is started.

Also, when a content reproduction API is executed by the stored application (Stored App), the NRT content (content resources (Content Resources)) such as movie or music as a target of reproduction among the NRT content accumulated in the storage (Storage) is reproduced.

As described above, when the reception apparatus 20 operates in a manner tailored to the background NRT service of APP data type, the linked application (Linked App), the foreground application (FG App), the background application (BG App), or the stored application (Stored App) executes various APIs, thereby allowing various processes for the APIs to be performed. That is, as broadcast applications (BCAs) perform processes for various APIs in the reception apparatus 20, the broadcast applications (BCAs) run in a so-called chain reaction manner.

It should be noted that although an example is depicted in FIG. 9 in which broadcast applications (BCAs) perform processes for various APIs, applications other than broadcast applications (BCAs) may process data accumulated in the storage (Storage), one example of which is startup of a stored application (Stored App) by a resident application (RA) in accordance with the AITs accumulated in the storage (Storage).

(3-2) RAW Data Type

Figure 10:
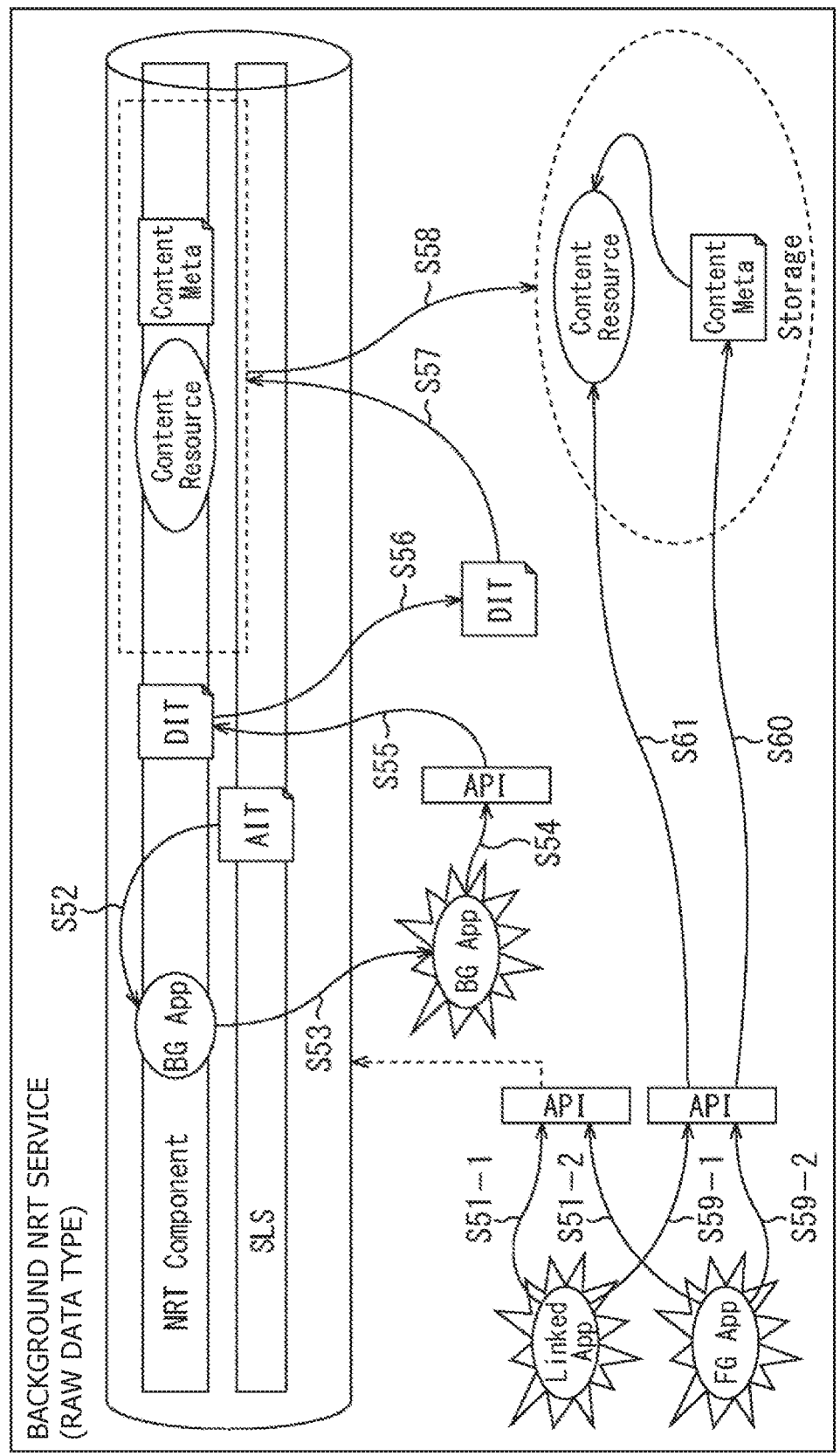
FIG. 10 is a diagram illustrating an example of a scenario of a background NRT service (RAW data type).

FIG. 10 is a diagram illustrating an example of a scenario of a background NRT service of RAW data type.

In FIG. 10, a broadcast stream includes NRT component and SLS signaling streams. It should be noted that although not depicted in the broadcast stream depicted in FIG. 10 for simpler description, other streams such as LLS signaling and ESG service may be included. Also, the NRT component stream is not limited to one stream, and a plurality of NRT component streams may be transported.

When such a broadcast stream is transported from the transmission apparatus 10 to the reception apparatus 20 via the transport channel 30, a background NRT service (RAW data type) provided in the reception apparatus 20 is realized as described below.

That is, when a program reservation tuning API (Application Programming Interface) is executed by the linked application (Linked App) or the foreground application (FG App) in the reception apparatus 20, NRT service tuning operation is reserved (S51-1, S51-2). As a result, the reservation of accumulation target NRT content is completed. It should be noted that NRT service tuning operation may be reserved by the series reservation tuning API in place of the program reservation tuning API.

Thereafter, when the reservation execution time (reservation start time) of the program specified by the program reservation tuning API arrives in the reception apparatus 20, the corresponding NRT service is tuned to. When an AIT for controlling the operation of a background application (BG App) in the NRT service tuned to is received in the reception apparatus 20, the background application (BG App) transported as an NRT component is acquired in accordance with the AIT (S52). Then, the background application (BG App) is started in the reception apparatus 20 in accordance with the AIT (S53).

At this time, the background application (BG App) is executed hidden. Then, the NRT download API is executed by this background application (BG App) (S54).

DIT metadata, transported as an NRT component, is acquired in the reception apparatus 20 in response to execution of the NRT download API by the background application (BG App) (S55, S56). Then, the background application (BG App) acquires a reference file group (Content Meta, Content Resource) (data thereof) transported as an NRT component on the basis of the acquired DIT metadata (S57, S58).

Here, the reference file group includes a content resource (Content Resource) and content metadata (Content Meta), content metadata of the content resource (Content Resource).

Thus, in the reception apparatus 20, the reference file group (Stored App, AITs), acquired in response to DIT metadata, is accumulated in the storage (Storage) by the hidden stored application (Stored App) that runs in the background. It should be noted that the storage (Storage) depicted in FIG. 10 corresponds to the storage 212 of the reception apparatus 20 depicted in FIG. 20.

Thereafter, when a content information acquisition API is executed by the linked application (Linked App) or the foreground application (FG App) in the reception apparatus 20 (S59-1, 59-2), information associated with NRT content (content information) is displayed on the basis of the content metadata (Content Meta) accumulated in the storage (Storage) (S60). As a result, for example, when the user issues an instruction to reproduce the NRT content whose content information is displayed, the reproduction of the NRT content (content resource (Content Resource)) is started.

Also, when a content reproduction API is executed by the linked application (Linked App) or the foreground application (FG App), the NRT content (content resource (Content Resource)) accumulated in the storage (Storage) is reproduced.

Thus, when the reservation start time of NRT service tuning operation arrives in the reception apparatus 20, the background application (BG App) is acquired in response to the AIT first by starting the reception of the applicable NRT service, after which the execution of the hidden background application (BG App) is started. As a result, only the reference file group including the content resource (Content Resource) and the content metadata (Content Meta) is accumulated in the storage (Storage) in response to the DIT metadata. Then, as broadcast applications (BCAs) such as linked application (Linked App) or foreground application (FG App) execute various APIs, processes related to NRT content are performed in the reception apparatus 20.

As a result, in a background NRT service of RAW data type, processes for downloading and reproducing NRT content are realized by implementing broadcast applications (BCAs) such as background applications (BG Apps), thereby allowing for downloaded reproduction of NRT content by reducing load associated with implementing resident applications (RA).

(Example of a Process Performed by API)

Figure 11:
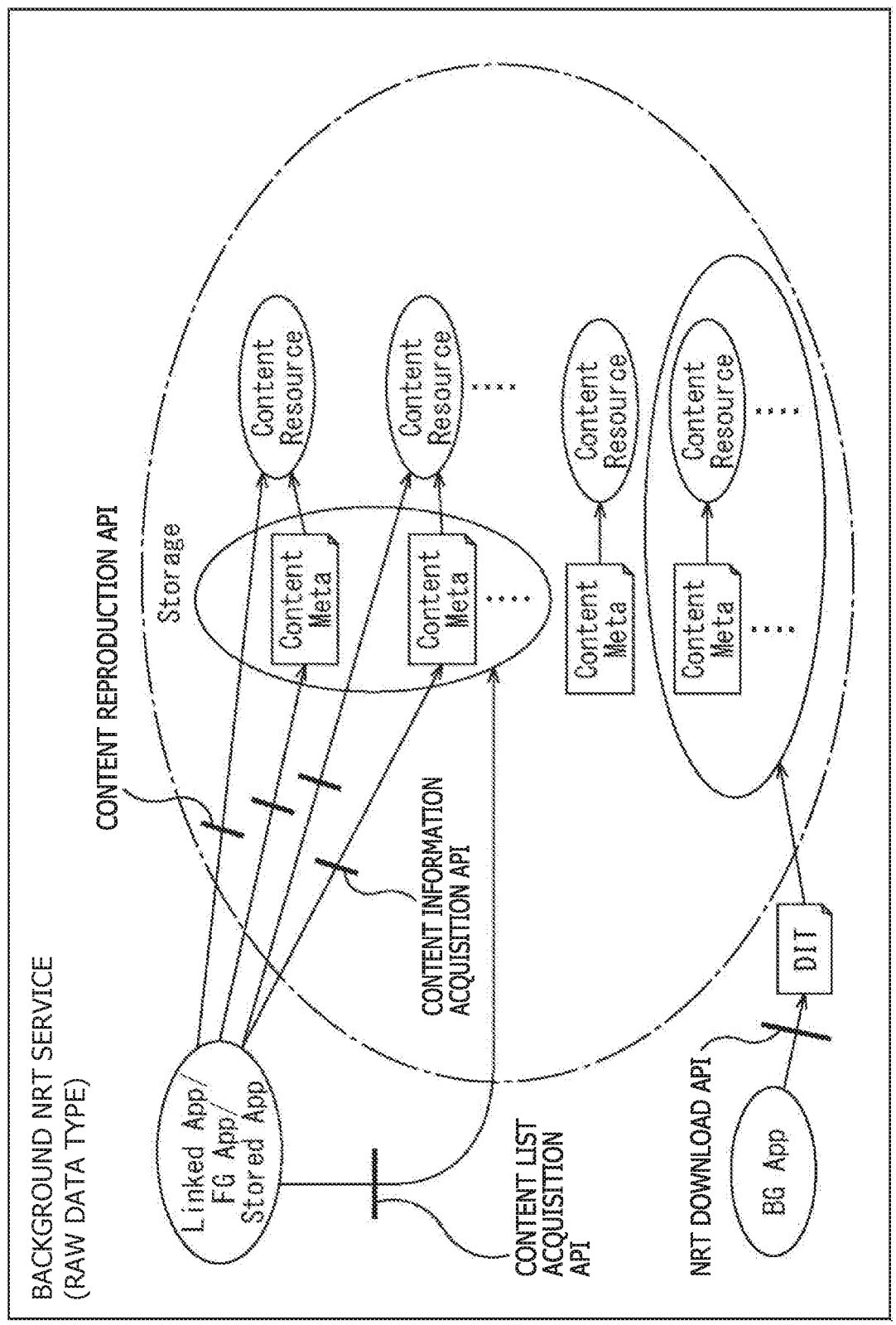
FIG. 11 is a diagram illustrating a relationship between application and storage data in the background NRT service (RAW data type).

FIG. 11 is a diagram illustrating a relationship between application and storage data in a background NRT service of RAW data type.

It should be noted, however, that we assume, in FIG. 11, that NRT service tuning operation has already been reserved as a result of execution of a program reservation tuning API or a series reservation tuning API by a linked application (Linked App) or a foreground application (FG App) in the reception apparatus 20. Also, the storage (Storage) enclosed by an ellipse illustrated by a long dashed short dashed line in FIG. 11 corresponds to the storage 212 of the reception apparatus 20 illustrated in FIG. 20.

In FIG. 11, when the reservation start time of NRT service tuning operation arrives in the reception apparatus 20, a background application (BG App) acquired by tuning to the applicable NRT service is started hidden, and an NRT download API is executed by this background application (BG App). As a result, DIT metadata is acquired. Therefore, the background application (BG App) acquires only a reference file group (data thereof), transported as an NRT component, on the basis of the DIT metadata and accumulates the file group in the storage (Storage).

As a result, only the reference file group (data thereof) is accumulated in the storage (Storage) of the reception apparatus 20. That is, a content resource (Content Resource) and content metadata (Content Meta), metadata of the content resource (Content Resource), as a reference file group are accumulated in the storage (Storage). It should be noted that we assume that the storage (Storage) depicted in FIG. 11 stores not only the reference file group (data thereof) accumulated at the current time but also other data (target file group and reference file group data) that was already accumulated at the previous time.

Thereafter, when a content list acquisition API is executed by the linked application (Linked App), the foreground application (FG App), or the stored application (Stored App) in the reception apparatus 20, a list of NRT content (content resources (Content Resources)) accumulated in the storage (Storage) is generated and displayed on the basis of the one or plurality of pieces of content metadata (Content Meta) accumulated in the storage (Storage). As a result, for example, a piece of NRT content (content resources (Content Resources)) such as movie or music selected by the user from among the NRT content list is reproduced.

Also, when a content information acquisition API is executed by the linked application (Linked App), the foreground application (FG App), or the stored application (Stored App), information associated with NRT content (content information) is displayed on the basis of the target content metadata (Content Meta) to be acquired among the one or plurality of pieces of content metadata (Content Meta) accumulated in the storage (Storage). As a result, for example, when the user issues an instruction to reproduce the NRT content whose content information is displayed, the reproduction of the NRT content (content resources (Content Resources)) is started.

Also, when a content reproduction API is executed by the linked application (Linked App), the foreground application (FG App), or the stored application (Stored App), the NRT content (content resources (Content Resources)) such as movie or music as a target of reproduction among the NRT content accumulated in the storage (Storage) is reproduced.

As described above, when the reception apparatus 20 operates in a manner tailored to the background NRT service of RAW data type, the linked application (Linked App), the foreground application (FG App), the background application (BG App), or the stored application (Stored App) executes various APIs, thereby allowing various processes for the APIs to be performed. That is, as broadcast applications (BCAs) perform processes for various APIs in the reception apparatus 20, the broadcast applications (BCAs) run in a so-called chain reaction manner.

It should be noted that, in FIG. 11, the stored application (Stored App) is included in the target file group (data thereof) accumulated at a time earlier than the current time. That is, in FIG. 11, the target file group and the reference file group (data thereof) provided by the background NRT service of APP data type and the reference file group (data thereof) provided by the background NRT service of RAW data type exist in a mixed condition in the storage (Storage) of the reception apparatus 20.

(State Transition Diagram)

Figure 12:
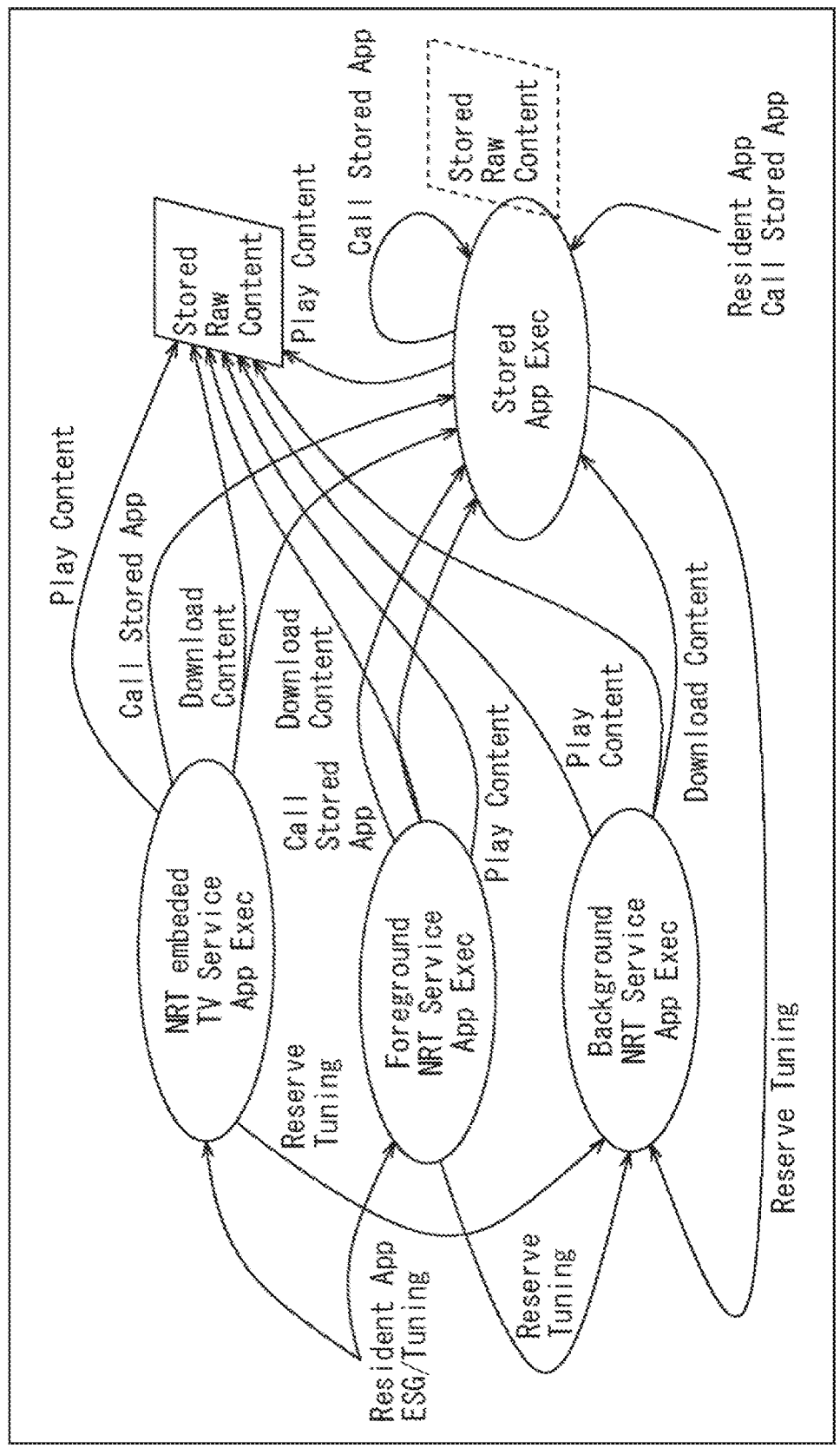
FIG. 12 is a diagram illustrating a state transition diagram of an NRT service.

FIG. 12 is a diagram illustrating a state transition diagram of an NRT service.

As depicted in FIG. 12, an NRT embedded TV service (NRT embedded TV Service) or a foreground NRT service (Foreground NRT Service) is started in response to operation of a resident application (RA) or tuning operation by Electronic Service Guide (ESG), thereby starting a linked application (Linked App) or a foreground application (FG App).

Then, when NRT service tuning operation is reserved by the linked application (Linked App) or the foreground application (FG App), the reception of a background NRT service (Background NRT Service) is started in response to the reservation of NRT service tuning operation, thereby starting a background application (BG App). A stored application (Stored App), a content resource (Content Resource) of NRT content, and so on are downloaded by this background application (BG App), and these pieces of data are accumulated in the storage.

Here, for example, the linked application (Linked App), the foreground application (FG App), or the stored application (Stored App) can be switched to the stored application (Stored App) accumulated in the storage by executing various APIs. Also, as the linked application (Linked App), the foreground application (FG App), or the stored application (Stored App) executes various APIs, the content resource (Content Resource) of NRT content accumulated in the storage can be processed.

It should be noted that an application other than broadcast applications (BCA) may process data accumulated in the storage, one example of which is startup of a stored application (Stored App) accumulated in the storage by a resident application (RA).

Also, although an example has been described above in which, for reasons of description, NRT services are broadly classified into NRT embedded TV service, foreground NRT service, and background NRT service, and in which an NRT component of a target file group and a reference file group (or only a reference file group) is provided by the background NRT service, the NRT component may be provided by an NRT embedded TV service or a foreground NRT service.

Here, FIG. 13A illustrates a case in which an NRT component of a target file group and a reference file group is provided by an NRT embedded TV service. Also, FIG. 13B illustrates a case in which an NRT component of a target file group and a reference file group is provided by a foreground NRT service.

<4. Example of API Used in NRT Service>
(Program Reservation Tuning API)

FIG. 14 is a diagram illustrating an example of a program reservation tuning API.

The program reservation tuning API is an API for reserving tuning operation of a specified action type (action_type).

broadcast_stream_id, service_id, reservation_start_time, reservation_duration, schedule_fragment_uri, and action_type can be specified for the program reservation tuning API as arguments.

A broadcast stream ID, an identifier for identifying a target frequency band (RF band) to be tuned to is specified as broadcast_stream_id. A service ID, an identifier for identifying a target service to be tuned to is specified as service_id. That is, specific target services to be tuned to are identified by the broadcast stream ID and the service ID.

A tuning start time indicting a time when tuning starts is specified as reservation_start_time. A tuning duration indicating time period for which tuning lasts is specified as reservation_duration.

It should be noted that reservation_start_time and reservation_duration are options and that it is optional to specify them as arguments. That is, if time information is acquired about a target service to be reserved using ESG service, for example, it is not necessary to specify reservation_start_time and reservation_duration.

A program ID of a target program to be reserved is specified as schedule_fragment_uri. It should be noted that schedule_fragment_uri is an option and that it is optional to specify it as an argument.

Type information indicating operation at the time of tuning is specified as action_type. For example, when "1" is specified as action_type, this means that normal tuning and reproduction will be performed. Also, for example, when "2" is specified as action_type, this means that tuning and reproduction will be performed in the background. That is, when the program reservation tuning API is executed in a background NRT service, "2" is specified as action_type. Further, for example, when "3" is specified as action_type, this means that recording (or reproduction and recording) will be performed.

(NRT Download API)

FIG. 15 is a diagram illustrating an example of an NRT download API.

The NRT download API is an API for acquiring a specific file (group of files) transported by the NRT service currently being received by the reception apparatus 20 and accumulating it in the storage.

dit_uri can be specified for the NRT download API as an argument.

A URI (Uniform Resource Identifier) of a source of acquisition of DIT metadata is specified as dit_uri.

(Application Switching API)

FIG. 16 is a diagram illustrating an example of an application switching API.

The application switching API is an API for exiting a broadcast application that executed the method and starting a broadcast application specified by an argument.

organization_id, application_id, and ait_uri can be specified for the application switching API as arguments.

A broadcasting organization ID, an identifier for identifying a broadcasting organization of a broadcast application (BCA) to be started is specified as organization_id. An application ID, an identifier for identifying a broadcast application (BCA) to be started is specified as application_id. That is, a broadcast application (BCA) which is a destination application to be started is identified by the broadcasting organization ID and the application ID.

AIT location information (e.g., URL) of a destination broadcast application (BCA) is specified as ait_uri. For example, when the destination broadcast application (BCA) is a stored application (Stored App), the URL of the AITs for that stored application (Stored App) is specified as ait_uri.

(Other API)

FIG. 17 is a diagram illustrating examples of other APIs.

An application list acquisition API is an API for acquiring a list of stored applications (Stored Apps) accumulated in the storage of the reception apparatus 20. Also, a content list API is an API for acquiring a list of NRT content (content resources (Content Resources)) accumulated in the storage of the reception apparatus 20.

A content information acquisition API is an API for acquiring information included in NRT content metadata (content metadata (Content Meta)) accumulated in the storage of the reception apparatus 20. Also, a content reproduction API is an API for reproducing NRT content accumulated in the storage of the reception apparatus 20.

A series reservation tuning API is an API for reserving tuning operation of a service (e.g., NRT service) on a series-by-series basis. That is, by executing this series reservation tuning API in place of the program reservation tuning API (FIG. 14), it is possible to reserve tuning operation of NRT service on a given-series-by-given-series basis rather than on a program-by-program basis. It should be noted that the APIs listed here are merely examples and that other APIs executed by broadcast applications (BCAs) may be defined.

5. Example of Syntax

FIG. 18 is a diagram illustrating an example of DIT (Download Information Table) syntax in XML format. It should be noted that, in FIG. 18, of elements and attributes, "@" is attached to the attributes. Also, indented elements and attributes are those specified by their upper elements.

A DIT element is a root element and an upper element of a dl_id attribute, a dl version attribute, app_included attribute, an app_type attribute, an organization_id attribute, an application_id attribute, an app_version attribute, an expire attribute, a baseURI attribute, and a content_item element.

A download ID for identifying a unit of download is specified as the dl_id attribute. A version in the same download ID is specified as the dl version attribute.

A flag indicating whether a stored application (Stored App) provided in a background NRT service is included is specified as the app_included attribute. That is, this flag allows for identification of which type the background NRT service is, APP data type or RAW data type.

For example, when "0" is specified as the app_included attribute, it indicates that the background NRT service is of RAW data type that does not include any stored application (Stored App). On the other hand, when "1" is specified as the app_included attribute, it indicates that the background NRT service is of APP data type that includes a stored application (Stored App).

Here, information associated with an application is specified as the app_type attribute, the organization_id attribute, the application_id attribute, and the app_version attribute. However, when "1" is specified as the app_included attribute (in the case of a background NRT service of APP data type), information associated with a stored application (Stored App) is specified as these attributes. On the other hand, when "0" is specified as the app_included attribute (in the case of a background NRT service of RAW data type), information associated with an application that can refer to NRT content (content resource (Content Resource)) is specified as these attributes.

An application type is specified as the app_type attribute. For example, when "std" is specified as the app_type attribute, it indicates that the application is a standard broadcast application (BCA) that starts in response to AIT (Application Information Table).

Also, an application that runs in an execution environment such as "android" or "iOS" can be specified as the app_type attribute. "android" indicates that the application runs on the Android (registered trademark) platform. Also, "iOS" indicates that the application runs on the iOS (registered trademark) platform.

A broadcasting organization ID is specified as the organization_id attribute. An application ID for identifying the application is specified as the application_id attribute. That is, the broadcasting organization ID and the application ID allow for identification of a target application. An application version is specified as the app_version attribute.

An application, NRT content, or other file retention deadline is specified as the expire attribute.

Of a URL of a file to be downloaded, the basic URL of a common portion (base URL) is specified as the baseURI attribute.

Information associated with a file to be downloaded is specified as the content_item attribute. The content_item element is an upper element of an item_path attribute, an item_type attribute, an item_version attribute, an expire attribute, and an essential attribute.

A file path following a file URL or a base URL is specified as the item_path attribute. That is, a specific file URL is specified by combining a base URL specified by the baseURI attribute and a URL specified by the item_path attribute. For example, this URL makes it possible to identify a file transported over a ROUTE session or files accumulated in the storage.

A file type is specified as the item_type attribute. A file version is specified as the item_version attribute. A retention deadline of each file is specified as the expire attribute. A flag indicating whether a download is required or optional is specified as the essential attribute. For example, when there is no need to download a stored application (Stored App) such as player because the same stored application (Stored App) has already been downloaded, "0" is specified as the essential attribute.

It should be noted that, in FIG. 18, as for cardinality (Cardinality), when "1" is specified, only one of that element or attribute is specified. When "0 . . . 1" is specified, it is optional whether to specify that element or attribute. Also, when "1 . . . N" is specified, one or more of that element or attribute are specified, and when "0 . . . N" is specified, it is optional whether to specify one or more of that element or attribute.

Also, when "unsigned Short" or "unsigned integer" is specified as data_type, it indicates that the value of that element or attribute is of integer type. Also, when "Boolean" is specified as Data Type, it indicates that that element or attribute is of Boolean type. When "string" is specified, it indicates that that element or attribute is of character string type. Further, when "dateTime" is specified as Data Type, it indicates that that element or attribute is of date/time type, and when "anyURI" is specified, it indicates that that element or attribute is of anyURI data type.

It should be noted that the DIT syntax depicted in FIG. 18 is merely an example and that other syntax may be used such as adding other elements and attributes or deleting some elements and attributes. Also, DIT is not limited to XML format and may be described in other markup language. Alternatively, DIT may be in section format.

6. Configuration of Each Apparatus

A description will be given next of configuration examples of the transmission apparatus 10 and the reception apparatus 20 making up the transport system depicted in FIG. 1.

(Configuration of the Transmission Apparatus)

FIG. 19 is a diagram illustrating a configuration example of the transmission apparatus 10 depicted in FIG. 1.

The transmission apparatus 10 is a transmitter compliant with a given broadcasting standard such as ATSC 3.0 and handles data transport using an IP transport scheme digital broadcast signal.

In FIG. 19, the transmission apparatus 10 includes a video acquisition section 101, a video encoder 102, an audio acquisition section 103, an audio encoder 104, an NRT component generation section 105, an NRT component processing section 106, a signaling generation section 107, a signaling processing section 108, a multiplexer 109, and a transmission section 110.

The video acquisition section 101 acquires video component data making up broadcast content such as TV program and supplies the data to the video encoder 102. The video encoder 102 encodes the video component data supplied from the video acquisition section 101 in accordance with a given coding scheme and supplies the data to the multiplexer 109.

The audio acquisition section 103 acquires audio component data making up broadcast content such as TV program and supplies the data to the audio encoder 104. The audio encoder 104 encodes the audio component data supplied from the audio acquisition section 103 in accordance with a given coding scheme and supplies the data to the multiplexer 109.

Here, broadcast content includes, for example, live content (e.g., live broadcasting such as on-the-spot sports broadcasting) sent via a transport channel or a communication circuit from a relay point or recorded content accumulated in the storage (e.g., prerecorded programs such as dramas).

The NRT component generation section 105 generates an NRT component and supplies the component to the NRT component processing section 106. The NRT component processing section 106 processes the NRT component supplied from the NRT component generation section 105 and supplies the processed component to the multiplexer 109.

Here, a broadcast application (BCA) such as linked application (Linked App), foreground application (FG App), or background application (BG App) is generated as an NRT component. Also, when a background NRT service is used, a target file group (stored application (Stored App) and AITs), a reference file group (content metadata (Content Meta) and content resource (Content Resource)), and so on are generated as an NRT component.

It should be noted that although an example will be described in which, for reasons of description, NRT content (content metadata (Content Meta)) is generated by the NRT component generation section 105 and processed by the NRT component processing section 106, broadcast content processed by the video acquisition section 101 or the audio acquisition section 103 may be processed as an NRT content.

The signaling generation section 107 generates signaling and supplies it to the signaling processing section 108. The signaling processing section 108 processed the signaling supplied from the signaling generation section 107 and supplies the signaling to the multiplexer 109.

Here, for example, LLS signaling or SLS signaling is generated as signaling. LLS signaling includes metadata such as SLT. Also, SLS signaling includes metadata such as AIT. Further, when background NRT services are operated, AITs and DIT metadata are generated as signaling. It should be noted, however, that AITs and DIT metadata are processed as NRT components.

The multiplexer 109 is supplied with encoded video component data supplied from the video encoder 102, encoded audio component data supplied from the audio encoder 104, NRT component data supplied from the NRT component processing section 106, or signaling data supplied from the signaling processing section 108.

The multiplexer 109 generates a multiplexed stream by multiplexing video component data, audio component data, NRT component data, and signaling data and supplies the multiplexed stream to the transmission section 110.

It should be noted, however, that when foreground NRT services or background NRT services are operated, video component data and audio component data making up broadcast content may not be included in a multiplexed stream. Also, although not described here, data such as Electronic Service Guide (ESG) and time information (e.g., NTP (Network Time Protocol)) may be included in a multiplexed stream.

The transmission section 110 processes the multiplexed stream supplied from the multiplexer 109 and sends the stream as an IP transport scheme digital broadcast signal via an antenna 121.

Here, for example, an error correction coding process (e.g., BCH coding and LDPC (Low Density Parity Check) coding) and a modulation process (e.g., OFDM (Orthogonal Frequency Division Multiplexing) modulation) are performed on the multiplexed stream data, and the resultant signal is converted into an RF (Radio Frequency) signal and sent.

The transmission apparatus 10 is configured as described above. It should be noted that although a case is depicted in FIG. 19 in which, for reasons of description, the transmitting apparatus includes a transmission apparatus, i.e., a single apparatus, the transmission apparatus may be configured as a transmission system that includes a plurality of apparatuses having the respective functions depicted in FIG. 19.

(Configuration of the Reception Apparatus)

FIG. 20 is a diagram illustrating a configuration example of reception apparatus 20 depicted in FIG. 1.

The reception apparatus 20 is a receiver compliant with a given broadcasting standard such as ATSC 3.0 and receives and processes an IP transport scheme digital broadcast signal sent from the transmission apparatus 10.

In FIG. 20, the reception apparatus 20 includes a control section 201, a memory 202, an input section 203, a reception section 204, a demultiplexer 205, a signaling processing section 206, a video decoder 207, a video output section 208, an audio decoder 209, an audio output section 210, an NRT component processing section 211, a storage 212, a display section 213, and a speaker 214.

The control section 201 controls the operation of the respective sections of the reception apparatus 20.

The memory 202 is a non-volatile memory such as NVRAM (Non Volatile RAM). The memory 202 stores various data under control of the control section 201.

The input section 203 supplies an operation signal appropriate to the operation from the user to the control section 201. The control section 201 controls the operation of the respective sections of the reception apparatus 20 on the basis of the operation signal from the input section 203.

The reception section 204 receives an IP transport scheme digital broadcast signal sent from the transmission apparatus 10 via an antenna 221 and processes the signal, and supplies the multiplexed stream obtained as a result thereof to the demultiplexer 205.

Here, for example, an RF signal is converted in frequency into an IF (Intermediate Frequency) signal and demodulated (e.g., OFDM demodulated), and a signal obtained as a result of the process is subjected to an error correction decoding process (e.g., LDPC decoding or BCH decoding).

The demultiplexer 205 separates the multiplexed stream, supplied from the reception section 204 under control of the control section 201, into video component data, audio component data, NRT component data, or signaling data.

The demultiplexer 205 supplies video component data, audio component data, NRT component data, and signaling data to the video decoder 207, the audio decoder 209, the NRT component processing section 211, and the signaling processing section 206, respectively.

It should be noted, however, that, of the NRT component data, target file group (Stored App, AITs) data and reference file group (Content Meta, Content Resource) data during operation of a background NRT service is accumulated in the storage 212.

Also, when a foreground NRT service or a background NRT service is operated, video component or audio component data making up broadcast content may not be included in a multiplexed stream. Also, although not described here, when data such as Electronic Service Guide (ESG) and time information (e.g., NTP) is included in a multiplexed stream, such data is also processed.

The signaling processing section 206 processes the signaling supplied from the demultiplexer 205 and supplies a processing result to the control section 201. The control section 201 controls the operation of the respective sections of the reception apparatus 20 that process the broadcast content on the basis of the processing result of the signaling supplied from the signaling processing section 206.

Here, for example, LLS signaling or SLS signaling is processed as signaling. LLS signaling includes metadata such as SLT. Also, SLS signaling includes metadata such as AIT.

Also, when a background NRT service is operated, DIT metadata is included as signaling. The control section 201 controls the operation of the respective sections of the reception apparatus 20 that process broadcast applications (BCAs), NRT components, and so on the basis of the processing result of the DIT metadata supplied from the signaling processing section 206.

The video decoder 207 decodes the video component data supplied from the demultiplexer 205 in accordance with a given decoding scheme and supplies the data to the video output section 208. The video output section 208 displays, on the display section 213, the image for the video component data supplied from the video decoder 207.

The audio decoder 209 decodes the audio component data supplied from the demultiplexer 205 in accordance with a given decoding scheme and supplies the data to the audio output section 210. The audio output section 210 outputs, from the speaker 214, the audio for the audio component data supplied from the audio decoder 209.

As a result, in the reception apparatus 20, broadcast content such as live content (e.g., live broadcasting such as on-the-spot sports broadcasting) and recorded content (e.g., dramas recorded in advance) is reproduced, and its image and sound are output.

The NRT component processing section 211 processes, under control of the control section 201, NRT component data supplied from the demultiplexer 205 and supplies image-related data to the video output section 208 and sound-related data to the audio output section 210. Here, a broadcast application (BCA) such as linked application (Linked App), foreground application (FG App), or background application (BG App) is processed as an NRT component.

With a linked application (Linked App) and a foreground application (FG App), the image thereof is displayed. Therefore, data of these applications is supplied to the video output section 208. As a result, the image for the operation of the linked application (Linked App) or the foreground application (FG App) is displayed on the display section 213. On the other hand, a background application (BG App) is hidden because it runs in the background.

The storage 212 accumulates NRT components supplied from the demultiplexer 205. As NRT components accumulated in the storage 212, target file group (Stored App, AITs) data and reference file group (Content Meta, Content Resource) data is accumulated when a background NRT service is operated.

The NRT component processing section 211 reads, under control of the control section 201, NRT component data accumulated in the storage 212 and processes the data and supplies image-related data to the video output section 208 and sound-related data to the audio output section 210. Here, target file group (Stored App, AITs) data and reference file group (Content Meta, Content Resource) data is processed as an NRT component, and processes related to a stored application (Stored App) or NRT content are performed.

With a stored application (Stored App), the image thereof is displayed. Therefore, data of the application is supplied to the video output section 208. As a result, the image for the operation of the stored application (Stored App) is displayed on the display section 213.

Also, for example, when the NRT content is a movie or the like, the video component data thereof is supplied to the video output section 208, and the audio component data thereof is supplied to the audio output section 210, thereby allowing the image and sound of the NRT content such as movie to be output (reproduced). Further, for example, when the NRT content is music or the like, the audio component data thereof is supplied to the audio output section 210, thereby allowing the sound of the NRT content such as music to be output (reproduced).

The reception apparatus 20 is configured as described above. It should be noted that the reception apparatus 20 may be, for example, a stationary receiver such as TV receiver, set top box (STB), and recorder, or a mobile receiver such as mobile phone, smartphone, or tablet terminal. Also, the reception apparatus 20 may be a vehicle-mounted device mounted to a vehicle.

Further, although, in the configuration of the reception apparatus 20 depicted in FIG. 20, the display section 213 and the speaker 214 are built into the reception apparatus 20, the display section 213 and the speaker 214 may be provided outside the reception apparatus 20. Also, although not depicted in the configuration of the reception apparatus 20 depicted in FIG. 20, a resident application (RA) is built into the reception apparatus 20 in advance, and various processes are performed by this resident application (RA). Also, the NRT component processing section 211 is, for example, a browser compliant with HTML5.

(Software and Hardware Hierarchical Structures)

FIG. 21 is a diagram illustrating an example of software and hardware hierarchical structures in the reception apparatus 20 depicted in FIG. 20.

In FIG. 21, an operating system (OS) manages hardware. Also, the operating system (OS) provides an interface between applications and hardware, thereby allowing the applications running on the operating system (OS) to communicate with the hardware by following rules and procedures built into the operating system (OS).

Here, applications running on the operating system (OS) in the reception apparatus 20 are broadly classified into two types, built-in applications and broadcast applications (BCA).

Built-in applications are applications that are built in in advance and include, for example, resident applications (RAs), recording/reproduction control applications, and browsers. Also, broadcast applications (BCAs) are applications acquired via broadcasting and include linked applications (Linked Apps), foreground applications (FG Apps), background applications (BG Apps), stored applications (Stored Apps), and so on. It should be noted that broadcast applications (BCAs) are developed with HTML5 and so on.

In prior arts, in the case of NRT service operation, a resident application (RA) handled processes related to download and reproduction of NRT content, imposing significant load on implementation of the resident application (RA).

In the present technology, on the other hand, in the case of NRT service operation, a broadcast application (BCA) such as background application (BG App) handles processes related to download and reproduction of NRT content, allowing for download and reproduction of NRT content by reducing load associated with implementing a resident application (RA). Also, in the present technology, DIT metadata is defined by a background application (BG App) as metadata to be referred to during download of NRT content.

7. Flow of Processes Performed in Each Apparatus

A description will be given next of flows of processes performed in the transmission apparatus 10 and the reception apparatus 20 making up the transport system depicted in FIG. 1.

(Flow of the Transmission Process)

A description will be given first of a transmission process performed by the transmission apparatus 10 depicted in FIG. 1 with reference to the flowchart depicted in FIG. 22.

In step S101, the video acquisition section 101 and the video encoder 102 process a video component. Also, in step S101, the audio acquisition section 103 and the audio encoder 104 process an audio component.

In this processing of components, broadcasting content such as live content (e.g., live broadcasting) or recorded content (e.g., prerecorded programs) is acquired and subjected to encoding or other process in accordance with a given coding scheme.

In step S102, the NRT component generation section 105 and the NRT component processing section 106 process an NRT component.

In this processing of an NRT component, for example, a broadcast application (BCA) such as linked application (Linked App), foreground application (FG App), background application (BG App), or stored application (Stored App) is generated and processed. When a background NRT service is operated, a target file group (stored application (Stored App) and AITs) and a reference file group (content metadata (Content Meta) and content resource (Content Resource)) are also generated and processed as NRT components.

In step S103, the signaling generation section 107 and the signaling processing section 108 process signaling.

In this processing of signaling, LLS signaling including metadata such as SLT or SLS signaling including metadata such as AIT is generated and processed. Also, when a background NRT service is operated, DIT metadata is generated and processed as signaling.

In step S104, the multiplexer 109 generates a multiplexed stream by multiplexing video component and audio component data acquired by the process in step S101, NRT component data acquired by the process in step S102, and signaling data acquired by the process in step S103.

It should be noted, however, that when a foreground NRT service or a background NRT service is operated, video component and audio component data making up broadcast content may not be included in a multiplexed stream.

In step S105, the transmission section 110 processes the multiplexed stream generated by the process in step S104 and sends the stream via the antenna 121 as an IP transport scheme digital broadcast signal. When the process in step S105 ends, the transmission process depicted in FIG. 22 is terminated.

Hitherto, a description has been given of the flow of the transmission process.

(Tuning Process Flow)

Figure 23:
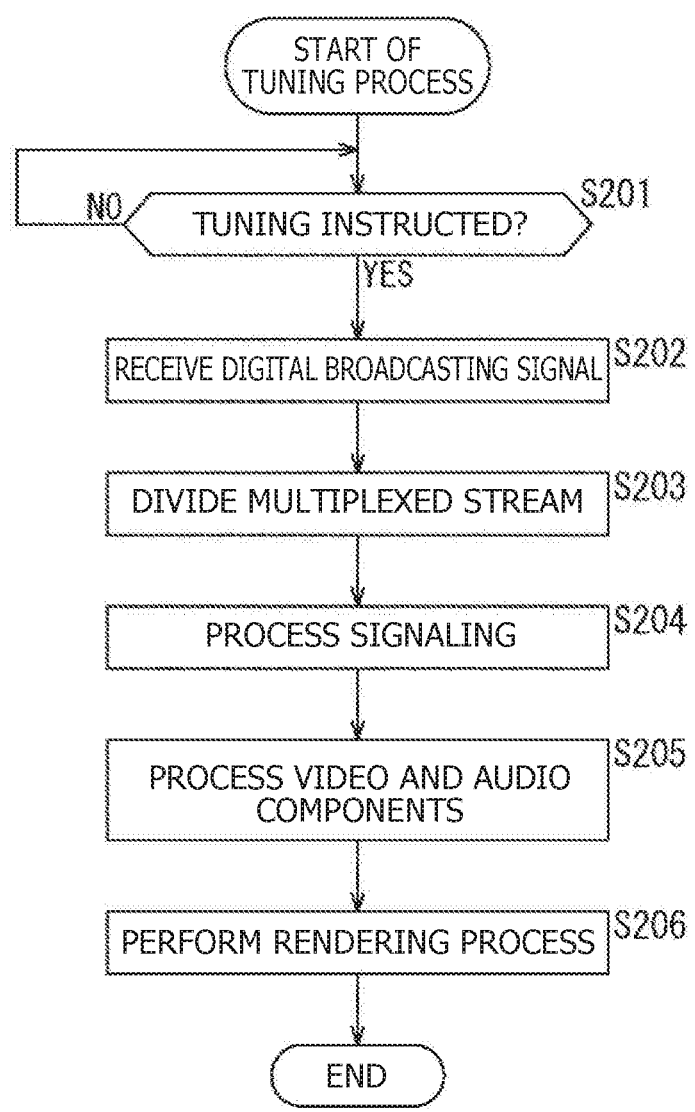
FIG. 23 is a flowchart describing a flow of a tuning process.

A description will be given next of a flow of a tuning process performed by the reception apparatus 20 depicted in FIG. 1 with reference to the flowchart depicted in FIG. 23.

In step S201, the control section 201 determines, on the basis of an operation signal from the input section 203, whether the user has issued a service tuning instruction. The determination process is repeated until it is determined in step S201 that the user has issued a tuning instruction. When it is determined in step S201 that the user has issued a tuning instruction, the process proceeds to step S202.

From step S202 to step S206, the tuning process is carried out as the control section 201 controls the operation of the respective sections of the reception apparatus 20 on the basis of tuning information (e.g., information included in SLT) stored in the memory 202. In this tuning process, the following processes are specifically carried out.

In step S202, the reception section 204 receives, via the antenna 221, under control of the control section 201, the IP transport scheme digital broadcast signal, sent from the transmission apparatus 10 via the transport channel 30, and processes the signal.

In step S203, the demultiplexer 205 separates, under control of the control section 201, the multiplexed stream acquired from the process in step S202.

In step S204, the signaling processing section 206 processes the signaling data (SLS signaling) separated by the process in step S203. The control section 201 controls the operation of the respective sections that processes the components on the basis of the signaling (SLS signaling) processed by the process in step S204.

In step S205, the video decoder 207 processes (decodes) the video component data separated by the process in step S203. Also, in step S205, the audio decoder 209 processes (decodes) the audio component data separated by the process in step S203.

In step S206, the video output section 208 processes (renders) the video component data from the video decoder 207 and displays the image for the video component data on the display section 213. Also, in step S206, the audio output section 210 processes (renders) the audio component data from the audio decoder 209 and outputs the sound for the audio component data from the speaker 214.

As a result, in the reception apparatus 20, an image of broadcast content such as live content (e.g., live broadcasting) or recorded content (e.g., prerecorded programs) is displayed on the display section 213, and a sound synchronous with the image is output from the speaker 214. When the process in step S206 ends, the tuning process depicted in FIG. 23 is terminated.

Hitherto, a description has been given of the flow of the tuning process.

(NRT Service Handling Process Flow)

A description will be given next of a flow of an NRT service handling process performed by the reception apparatus 20 depicted in FIG. 1 with reference to the flowchart depicted in FIG. 24.

In step S211, the control section 201 determines whether the NRT service executed by the reception apparatus 20 is an NRT embedded TV service. When it is determined in step S211 that the NRT service is an NRT embedded TV service, the process proceeds to step S212.

From step S212 to step S214, processes for the NRT embedded TV service are performed. In the case of this NRT embedded TV service, the linked application (Linked App) is an application executed in a linked manner with broadcast content. Therefore, we assume that broadcast content is reproduced by the tuning process depicted in FIG. 23 in the reception apparatus 20.

In step S212, the signaling processing section 206 acquires an AIT transported as SLS signaling over a ROUTE session and processes (e.g., analyzes) the AIT. Also, the control section 201 controls the operation of the respective sections on the basis of the processing result in step S212 (AIT analysis result).

In step S213, the NRT component processing section 211 acquires, under control of the control section 201, a linked application (Linked App) transported as an NRT component over a ROUTE session.

In step S214, the NRT component processing section 211 starts and executes the linked application (Linked App) acquired by the process in step S213. As a result, the linked application (Linked App) is executed in a linked manner with broadcast content in the reception apparatus 20, allowing an image for the linked application (Linked App) operation to be displayed on the display section 213 together with a broadcast content image.

On the other hand, when it is determined in step S211 that the NRT service is not an NRT embedded TV service, the process proceeds to step S215.

In step S215, the control section 201 determines whether the NRT service executed by the reception apparatus 20 is a foreground NRT service. When it is determined in step S215 that the NRT service is a foreground NRT service, the process proceeds to step S216.

From step S216 to step S218, processes for the foreground NRT service are performed. In the case of this foreground NRT service, the foreground application (FG App) is an application that displays a portal (portal page) image over the entire screen. Therefore, it is not always necessary for the reception apparatus 20 to reproduce broadcast content.

In step S216, the signaling processing section 206 acquires an AIT transported as SLS signaling over a ROUTE session and processes (e.g., analyzes) the AIT. Also, the control section 201 controls the operation of the respective sections on the basis of the processing result in step S216 (AIT analysis result).

In step S217, the NRT component processing section 211 acquires, under control of the control section 201, a foreground application (FG App) transported as an NRT component over a ROUTE session.

In step S218, the NRT component processing section 211 starts and executes the foreground application (FG App) acquired by the process in step S217. As a result, in the reception apparatus 20, a portal (portal page) image for the foreground application (FG App) operation is displayed over the entire screen of the display section 213.

On the other hand, when it is determined in step S215 that the NRT service is not a foreground NRT service, the process proceeds to step S219.

In step S219, the control section 201 determines whether the NRT service executed by the reception apparatus 20 is a background NRT service. When it is determined in step S219 that the NRT service is a background NRT service, the process proceeds to step S220.

In step S220, a process for the background NRT service is performed. In the case of this background NRT service, the background application (BG App) is a hidden application that runs in the background. Therefore, it is not always necessary for the reception apparatus 20 to reproduce broadcast content.

In step S220, the NRT component processing section 211, for example, performs a background NRT service handling process under control of the control section 201. In this background NRT service handling process, a background NRT service handling process for APP type or RAW data type is carried out.

Here, in the case of a handling process for a background NRT service of APP type, target file group (stored application (Stored App) and AITs) data and reference file group (content metadata (Content Meta) and content resource (Content Resource)) data is acquired and accumulated in the storage 212. In the case of a handling process for a background NRT service of RAW data type, on the other hand, only reference file group (content metadata (Content Meta) and content resource (Content Resource)) data is acquired and accumulated in the storage 212.

Figure 25:
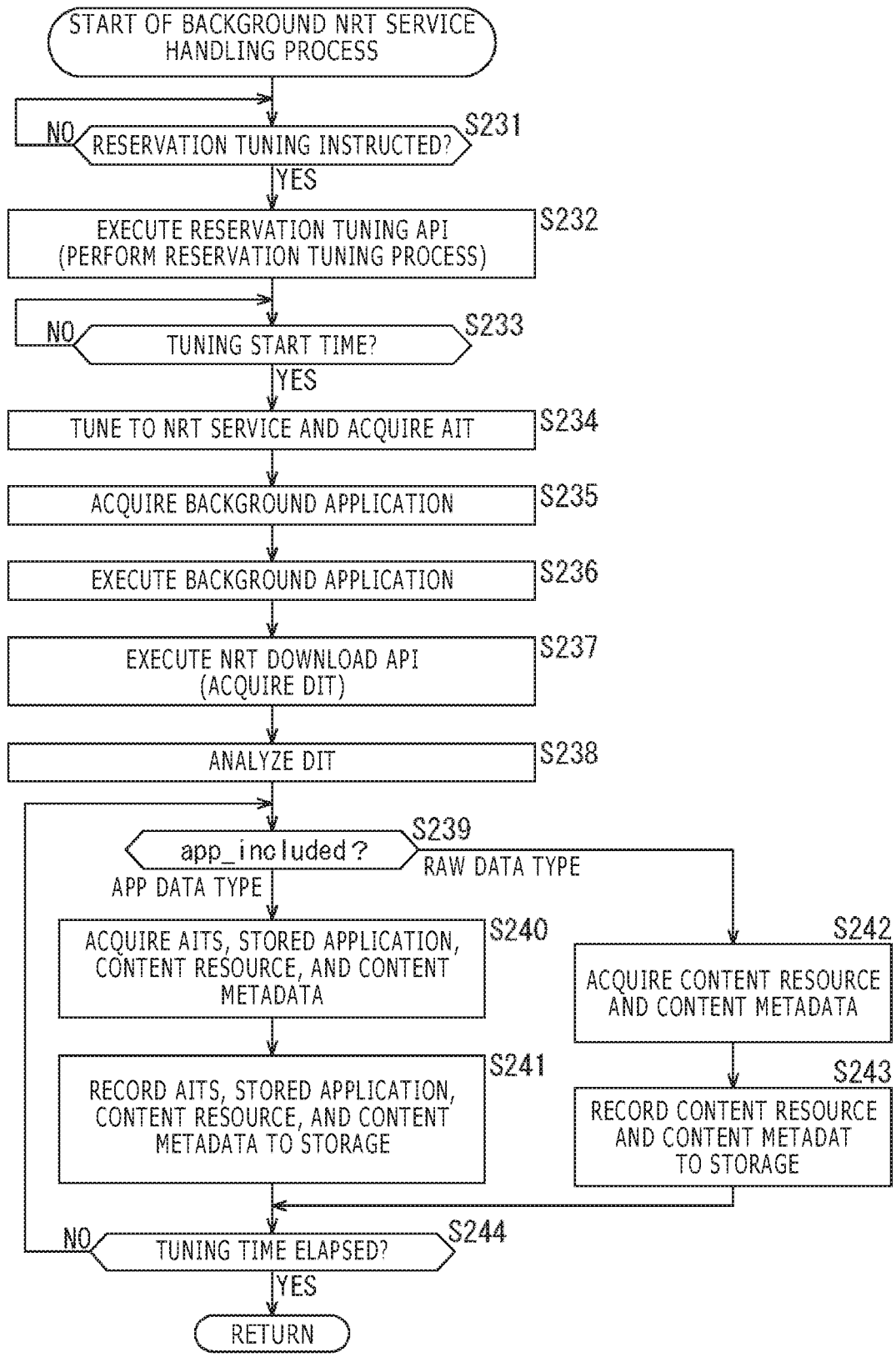
FIG. 25 is a flowchart describing a flow of a background NRT service handling process.

It should be noted that details of the background NRT service handling process will be described later with reference to the flowchart depicted in FIG. 25.

Also, when it is determined in step S219 that the NRT service is not a background NRT service, no NRT service process is performed. Therefore, the process in step S220 is skipped. Then, when the process in step S214, S218, or S220 ends, the NRT service handling process depicted in FIG. 24 is terminated.

Hitherto, a description has been given of the flow of the NRT service handling process.

(Flow of the Background NRT Service Handling Process)

A description will be given below of a flow of a background NRT service handling process for the process in step S220 depicted in FIG. 24 with reference to the flowchart depicted in FIG. 25.

In step S231, the control section 201 determines, for example, whether the user has issued an instruction to reserve tuning in response to operation of a broadcast application (BCA) such as linked application (Linked App) or foreground application (FG App). In step S231, the determination process is repeated until it is determined that the user has issued an instruction to reserve tuning. When it is determined in step S231 that the user has issued an instruction to reserve tuning, the process proceeds to step S232.

In step S232, the NRT component processing section 211 performs a reservation tuning process by executing a program reservation tuning API or a program reservation tuning API using a linked application (Linked App) or a foreground application (FG App) under the control of the control section 201. This reservation tuning process makes it possible to reserve NRT service tuning operation on a program-by-program basis or on a series-by-series basis.

In step S233, it is determined whether the tuning start time specified by the process in step S232 (reservation tuning process) has arrived. The determination process is repeated in step S233 until it is determined in step S232 that the tuning start time has arrived. When it is determined in step S233 that the tuning start time has arrived, the process proceeds to step S234.

In step S234, the control section 201, for example, performs tuning to an NRT service specified by the process in step S232 (reservation tuning process). Also, in step S234, the signaling processing section 206 acquires an AIT for controlling the operation of a background application (BG App), transported as SLS signaling over a ROUTE session, in response to the NRT service tuning operation and processes (analyzes) the AIT. The control section 201 controls the operation of the respective sections on the basis of the processing result in step S234 (analysis process).

In step S235, the NRT component processing section 211 acquires, under control of the control section 201, a background application (BG App) transported as an NRT component over a ROUTE session.

In step S236, the NRT component processing section 211 starts the execution of the background application (BG App) acquired at the process in step S235 under control of the control section 201 by starting the background application (BG App). It should be noted that the background application (BG App) is hidden because it is an application that runs in the background.

In step S237, the NRT component processing section 211 executes the NRT download API using the hidden background application (BG App). As a result, the signaling processing section 206 acquires DIT metadata transported as an NRT component over a ROUTE session.

In step S238, the signaling processing section 206 analyzes the DIT metadata acquired by the process in step S237.

In step S239, the control section 201 determines, on the basis of the analysis result of the process in step S238, whether the attribute value of the app_included attribute included in the DIT metadata indicates a background NRT service of APP data type or a background NRT service of RAW data type.

When it is determined in step S239 that the attribute value of the app_included attribute indicates a background NRT service of APP data type, the process proceeds to step S240.

In step S240, the NRT component processing section 211 acquires, under control of the control section 201, target file group data including an AITs and a stored application (Stored App) and reference file group data including a content resource (Content Resource) and content metadata (Content Meta), transported as an NRT component over a ROUTE session, by running the hidden background application (BG App).

In step S241, the NRT component processing section 211 records (accumulates), under control of the control section 201, the target file group data including an AITs and a stored application (Stored App) and the reference file group data including a content resource (Content Resource) and content metadata (Content Meta), acquired at the process in step S240, in the storage 212 by running the hidden background application (BG App).

On the other hand, when it is determined in step S239 that the attribute value of the app_included attribute indicates a background NRT service of RAW data type, the process proceeds to step S242.

In step S242, the NRT component processing section 211 acquires, under control of the control section 201, reference file group data including a content resource (Content Resource) and content metadata (Content Meta), transported as an NRT component over a ROUTE session, by running the hidden background application (BG App).

In step S243, the NRT component processing section 211 records (accumulates), under control of the control section 201, the reference file group data including a content resource (Content Resource) and content metadata (Content Meta), acquired at the process in step S242, in the storage 212 by running the hidden background application (BG App).

When the process in step S241 or in step S243 ends, the process proceeds to step S244. In step S244, it is determined whether the tuning time specified in the process (reservation tuning process) in step S232 has elapsed.

When it is determined in step S244 that the tuning time has yet to elapse, the process returns to step S239, and the subsequent processes are repeated.

That is, when a background NRT service handling process of APP data type is in progress, the NRT content download process initiated from the tuning start time is continued until the tuning time elapses, and target file group data and reference file group data transported as the NRT component is accumulated in the storage 212 (S240, S241).

Also, when a background NRT service handling process of RAW data type is in progress, the NRT content download process initiated from the tuning start time is continued until the tuning time elapses, and only reference file group data transported as the NRT component is accumulated in the storage 212 (S242, S243).

Figure 24:
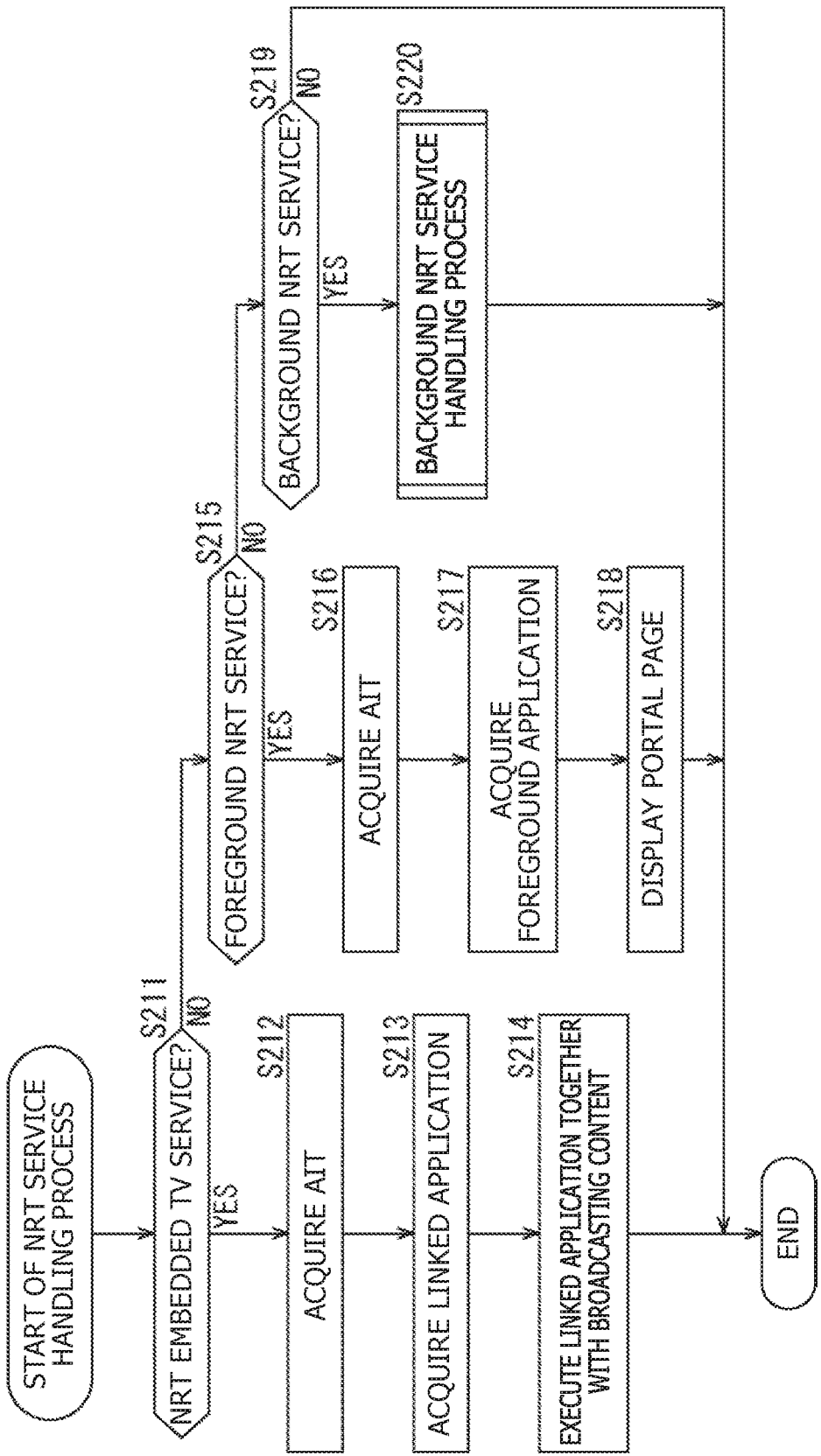
FIG. 24 is a flowchart describing a flow of an NRT service handling process.

Then, when it is determined in step S244 that the tuning time has elapsed, the process returns to the process in step S220 depicted in FIG. 24, and the subsequent processes are repeated.

Hitherto, a description has been given of the flow of the background NRT service handling process.

(Flow of the Event Handling Process)

Finally, a description will be given of a flow of an event handling process performed by the reception apparatus 20 depicted in FIG. 1 with reference to the flowchart depicted in FIG. 26. It should be noted that, as a result of this event handling process, various APIs are executed by various broadcast applications (BCA) such as linked application (Linked App), foreground application (FG App), or stored application (Stored App). Therefore, we assume that these broadcast applications (BCAs) are running.

In step S251, the control section 201 determines whether the user has issued an instruction to switch between broadcast applications (BCAs) on the basis of, for example, an operation signal from the input section 203.

When it is determined in step S251 that the user has issued an instruction to switch between broadcast applications (BCAs), the process proceeds to step S252. In step S252, the NRT component processing section 211 terminates, under control of the control section 201, a switching source broadcast application broadcast application (BCA) and starts a switching destination broadcast application (BCA) by executing the application switching API using a broadcast application (BCA).

Here, for example, a linked application (Linked App) or a foreground application (FG App) is switched over to a stored application (Stored App). Alternatively, a stored application (Stored App) is switched over to a linked application (Linked App) or a foreground application (FG App).

Also, when it is determined in step S251 that the user has not issued an instruction to switch between broadcast applications (BCAs), the process proceeds to step S253. In step S253, the control section 201 determines whether the user has issued an instruction to display a list of stored applications (Stored Apps) on the basis of, for example, an operation signal from the input section 203.

When it is determined in step S253 that the user has issued an instruction to display a list of stored applications (Stored Apps), the process proceeds to step S254. In step S254, the NRT component processing section 211 acquires, under control of the control section 201, a list of stored applications (Stored Apps) accumulated in the storage 212 (list for AITs) by executing the application list acquisition API using a broadcast application (BCA).

In step S255, the NRT component processing section 211 displays, under control of the control section 201, the list of stored applications (Stored Apps) acquired by the process in step S254 on the display section 213 via the video output section 208.

Here, for example, an instruction is issued to display a list of stored applications (Stored Apps) in response to user operation for a linked application (Linked App), a foreground application (FG App), or a stored application (Stored App), and the list of stored applications (Stored Apps) is displayed.

Also, when it is determined in step S253 that the user has not issued an instruction to display a list of stored applications (Stored Apps), the process proceeds to step S256. In step S256, the control section 201 determines whether the user has issued an instruction to display a list of NRT content on the basis of, for example, an operation signal from the input section 203.

When it is determined in step S256 that the user has issued an instruction to display an NRT content list, the process proceeds to step S257. In step S257, the NRT component processing section 211 acquires, under control of the control section 201, a list of NRT content accumulated in the storage 212 (list for content metadata (Content Meta)) by executing a content list acquisition API using a broadcast application (BCA).

In step S258, the NRT component processing section 211 displays, under control of the control section 201, the NRT content list acquired by the process in step S257 on the display section 213 via the video output section 208. Here, for example, an instruction is issued to display an NRT content list in response to user operation for a stored application (Stored App), and the NRT content list is displayed.

Also, when it is determined in step S256 that the user has not issued an instruction to display an NRT content list, the process proceeds to step S259. In step S259, the control section 201 determines whether the user has issued an instruction to display NRT content information on the basis of, for example, an operation signal from the input section 203.

When it is determined in step S259 that the user has issued an instruction to display NRT content information, the process proceeds to step S260. In step S260, the NRT component processing section 211 acquires, under control of the control section 201, NRT content information (information included in content metadata (Content Meta)) accumulated in the storage 212 by executing a content information acquisition API using a broadcast application (BCA).

In step S261, the NRT component processing section 211 displays, under control of the control section 201, information of the NRT content acquired by the process in step S260 on the display section 213 via the video output section 208. Here, for example, an instruction is issued to display NRT content information in response to user operation for a stored application (Stored App), and the NRT content information is displayed.

Also, when it is determined in step S259 that the user has not issued an instruction to display NRT content information, the process proceeds to step S262. In step S262, the control section 201 determines whether the user has issued an instruction to reproduce NRT content on the basis of, for example, an operation signal from the input section 203.

When it is determined in step S262 that the user has issued an instruction to reproduce NRT content, the process proceeds to step S263. In step S263, the NRT component processing section 211 reproduces, under control of the control section 201, target NRT content to be reproduced that is accumulated in the storage 212 by executing a content reproduction API using a broadcast application (BCA). Here, for example, an instruction is issued to reproduce NRT content in response to user operation for a stored application (Stored App), and the target NRT content to be reproduced is reproduced.

It should be noted that when it is determined in step S262 that the user has not issued an instruction to reproduce NRT content, none of the processes for various APIs is performed. Therefore, the process in step S263 is skipped. It should be noted, however, that the above API is merely an example. If other API is defined, it is only necessary to execute the API when the determination at the process in step S262 is "NO."

Figure 26:
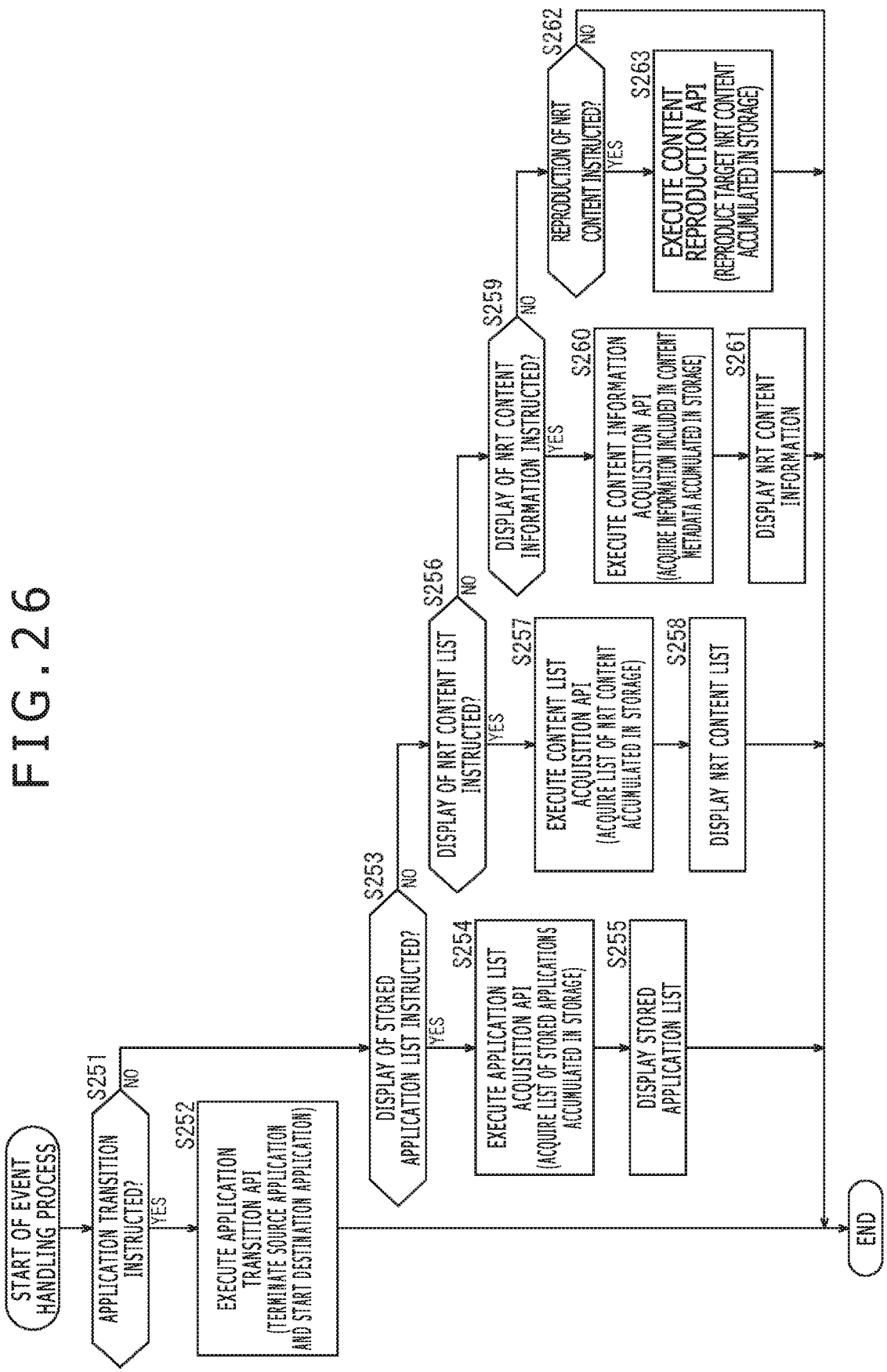
FIG. 26 is a flowchart describing a flow of an event handling process.

Also, when the process in step S252, step S255, step S258, step S261, or step S263 ends, the event handling process depicted in FIG. 26 is terminated.

Hitherto, a description has been given of the flow of the event handling process.

8. Modification Example

Although, in the above description, ATSC (ATSC 3.0 in particular), a scheme employed, for example, in the United States has been described as a digital broadcasting standard, the present technology may be applied to ISDB (Integrated Services Digital Broadcasting), a scheme adopted, for example, in Japan and DVB (Digital Video Broadcasting), a scheme adopted in European nations, and so on. Also, in that case, the present technology is applicable, among digital broadcasting, not only to terrestrial broadcasting and satellite broadcasting such as BS (Broadcasting Satellite) and CS (Communications Satellite) but also wired broadcasting such as cable TV (CATV).

Also, the present technology is applicable to a given standard (standard other than broadcasting standard) defined on the premise that transport channels other than broadcasting network, i.e., communication lines (communication networks) such as the Internet and telephone network are used as transport channels. In this case, a communication line such as the Internet or telephone network is used as the transport channel 30, and a server provided on the Internet can be used as the transmission apparatus 10. Then, as the reception apparatus 20 is rendered capable of communication, the transmission apparatus 10 performs processes in response to a request from the reception apparatus 20. Also, the reception apparatus 20 processes data sent from the transmission apparatus 10 (server) via the transport channel 30 (communication line).

Further, signaling names such as LLS and SLS are merely examples, and other names may be used. Such differences in name are merely differences in formality, and there is no difference in substance of each signaling. Further, when signaling is described using a markup language such as XML, names of elements and attributes thereof are merely examples, and other names may be adopted. It should be noted, however, that such differences in name are merely differences in formality and that there is no difference in substance of elements and attributes thereof.

Also, broadcast applications (BCAs) are not limited to those developed using a markup language such as HTML5. Instead, they may be applications developed using a programming language such as Java (registered trademark). It should be noted that a linked application (Linked App) may be referred to as a TDO (Triggered Declarative Object) and that a foreground application (FG App) may be referred to as an NDO (NRT Declarative Object). Also, any content such as electronic book, game, and advertisement in addition to movie and music may be included in NRT content.

9. Configuration of the Computer

Figure 27:
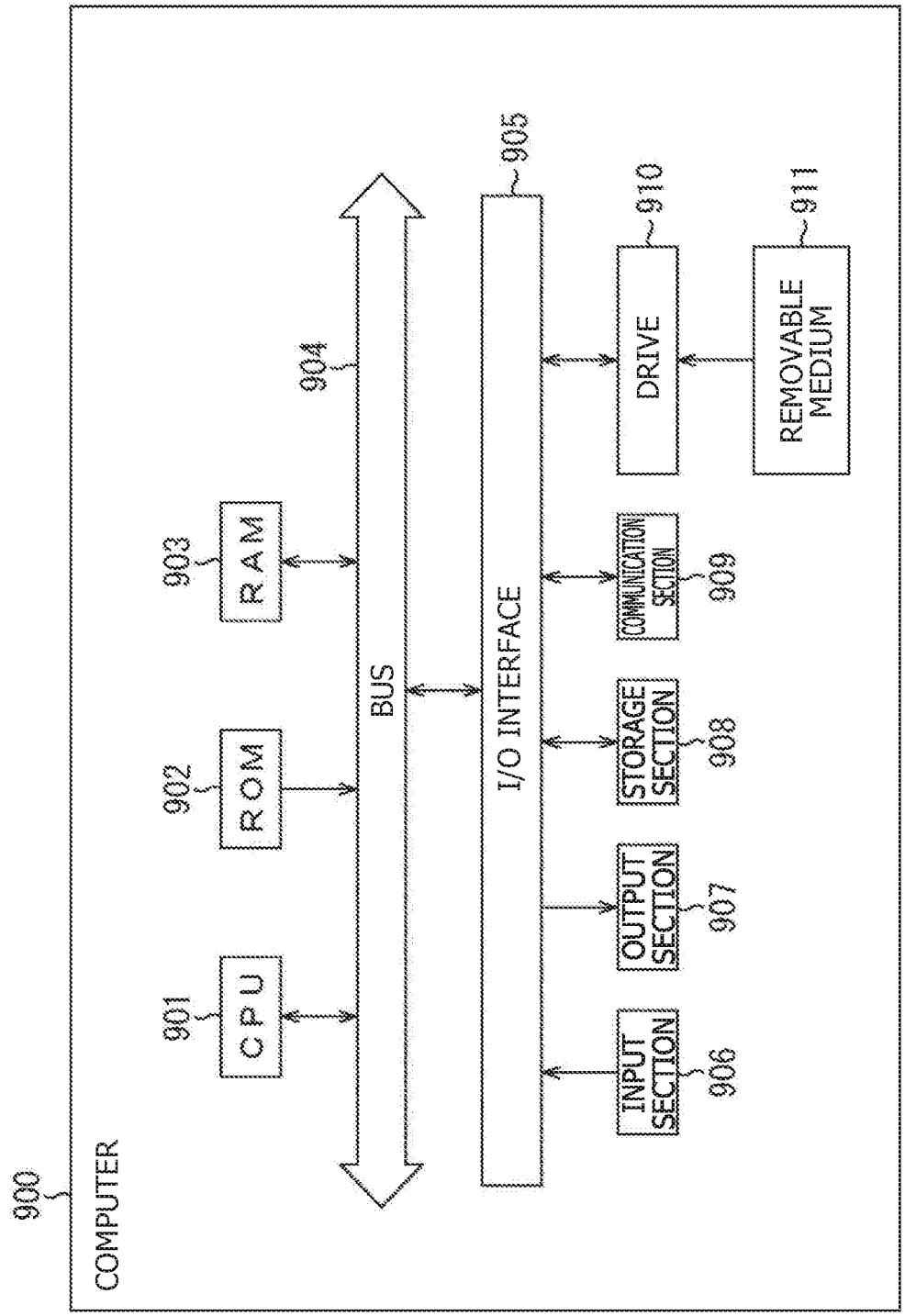
FIG. 27 is a diagram illustrating a configuration example of a computer.

The series of processes described above may be performed by hardware or software. When the series of processes are performed by software, the program making up the software is installed to a computer. FIG. 27 is a diagram illustrating a hardware configuration example of a computer for performing the above series of processes using the program.

In a computer 900, a CPU (Central Processing Unit) 901, a ROM (Read Only Memory) 902, and a RAM (Random Access Memory) 903 are connected to each other by a bus 904. An I/O interface 905 is further connected to the bus 904. An input section 906, an output section 907, a storage section 908, a communication section 909, and a drive 910 are connected to the I/O interface 905.

The input section 906 includes a keyboard, a mouse, a microphone, and so on. The output section 907 includes a display, a speaker, and so on. The storage section 908 includes a hard disk and a non-volatile memory. The communication section 909 includes a network interface and so on. The drive 910 drives a removable storage medium 911 such as magnetic disk, optical disc, magneto-optical disk, or semiconductor memory.

In the computer 900 configured as described above, the above series of processes are performed as the CPU 901 loads, for example, the program stored in the ROM 902 or the storage section 908 into the RAM 903 via the I/O interface 905 and the bus 904 for execution.

The program executed by the computer 900 (CPU 901) can be provided in a manner stored, for example, in the removable medium 911 as a packaged medium or the like. Alternatively, the program can be provided via a wired or wireless transport medium such as local area network, the Internet, and digital satellite broadcasting.

In the computer 900, the program can be installed to the storage section 908 via the I/O interface 905 as the removable medium 911 is inserted into the drive 910. Alternatively, the program can be received by the communication section 909 via a wired or wireless transport medium and installed to the storage section 908. In addition to the above, the program can be installed, in advance, to the ROM 902 or the storage section 908.

Here, in the present specification, the processes performed by the computer in accordance with the program need not necessarily be performed chronologically in accordance with the sequence described as a flowchart. That is, the processes performed by the computer in accordance with the program include those that are performed in parallel or individually (e.g., parallel processes or object-based processes). Also, the program may be processed by a single computer (processor) or by a plurality of computers in a distributed manner.

It should be noted that embodiments of the present technology are not limited to those described above and can be modified in various ways without departing from the gist of the present technology.

It should be noted that the present technology can have the following configurations:

(1)
A reception apparatus including:
a reception section adapted to receive a digital broadcast signal;
a first acquisition section adapted to acquire a first application, included in the digital broadcast signal, that handles a download of content reproduced in non-realtime;
a second acquisition section adapted to acquire metadata, included in the digital broadcast signal, that includes information for controlling the content download in response to operation of the first application; and
a control section adapted to handle the download of the content included in the digital broadcast signal by controlling the operation of the first application on the basis of the metadata.

(2)
The reception apparatus of feature (1), in which
the metadata includes at least
first information associated with the content,
second information associated with a second application that processes the content, and
third information indicating whether the second application is included in the digital broadcast signal together with the content.

(3)
The reception apparatus of feature (2), in which
the second information includes information associated with the second application downloaded together with the content when the third information indicates that the second application is included, and
the second information includes information associated with other application acquired separately from the content when the third information indicates that the second application is not included.

(4)
The reception apparatus of any one of features (1) to (3), in which
the first application is an application that runs in the background.

(5)
The reception apparatus of feature (2), in which
the first application is acquired in response to first control information for controlling the first application, and
the second application is acquired in response to second control information for controlling the second application.

(6)
The reception apparatus of feature (1) or (2), in which
the first application is acquired in response to reservation operation of a third application that reserves the content.

(7)
The reception apparatus of feature (6), in which
the third application can be switched over to the second application.

(8)
The reception apparatus of feature (6) or (7), in which
the second application can perform the content reservation operation.

(9)
The reception apparatus of any one of features (6) to (8), in which
the first application, the second application, and the third application are applications developed using a given markup language.

(10)

A data processing method of a reception apparatus, the data processing method including the steps of:

by the reception apparatus, receiving a digital broadcast signal;

acquiring a first application, included in the digital broadcast signal, that handles a download of content reproduced in non-realtime;

acquiring metadata, included in the digital broadcast signal, that includes information for controlling the content download in response to operation of the first application; and handling the download of the content included in the digital broadcast signal by controlling the operation of the first application on the basis of the metadata.

A transmission apparatus including:

a first generation section adapted to generate metadata that includes information for controlling a download of content reproduced in non-realtime;

a second generation section adapted to generate a first application that handles the content download; and a transmission section adapted to send the metadata and the first application included in a digital broadcast signal.

(12)

The transmission apparatus of feature (11), in which the metadata includes at least first information associated with the content, second information associated with a second application that processes the content, and third information indicating whether the second application is included in the digital broadcast signal together with the content.

(13)

The transmission apparatus of feature (12), in which the second information includes information associated with the second application downloaded together with the content when the third information indicates that the second application is included, the second information includes information associated with other application acquired separately from the content when the third information indicates that the second application is not included, the transmission section sends the second application together with the content when the third information indicates that the second application is included, and the transmission section sends only the content when the third information indicates that the second application is not included.

(14)

The transmission apparatus of any one of features (11) to (13), in which the first application is an application that runs in the background in the reception apparatus that receives the digital broadcast signal.

(15)

The transmission apparatus of feature (12), in which the transmission section sends first control information for controlling the operation of the first application and second control information for controlling the operation of the second application.

(16)

The transmission apparatus of feature (13), in which the transmission section sends a third application that reserves the content.

(17)

The transmission apparatus of feature (16), in which the first application, the second application, and the third application are applications developed using a given markup language.

(18)

A data processing method of a transmission apparatus, the data processing method including the steps of:

by the transmission apparatus, generating metadata that includes information for controlling a download of content to be reproduced in non-realtime;

generating a first application that handles the content download; and sending the metadata and the first application included in a digital broadcast signal.

REFERENCE SIGNS LIST

1 Transport system
10 Transmission apparatus
20 Reception apparatus
30 Transport channel
101 Video acquisition section
102 Video encoder
103 Audio acquisition section
104 Audio encoder
105 NRT component generation section
106 NRT component processing section
107 Signaling generation section
108 Signaling processing section
109 Multiplexer
110 Transmission section
201 Control section
202 Memory
203 Input section
204 Reception section
205 Demultiplexer
206 Signaling processing section
207 Video decoder
208 Video output section
209 Audio decoder
210 Audio output section
211 NRT component processing section
212 Storage
213 Display section
214 Speaker
900 Computer
901 CPU

The invention claimed is:

1. A reception apparatus comprising:

receiver circuitry configured to receive a digital broadcast signal; and processing circuitry configured to:

acquire a first application that handles acquisition of content reproduced in non-realtime, the first application acquired on the basis of first signaling data included in the digital broadcast signal, acquire metadata, which includes information for controlling the content acquisition in response to operation of the first application, the metadata included in the digital broadcast signal, and control acquisition of the content reproduced in non-realtime by controlling the operation of the first application on the basis of the metadata.

2. The reception apparatus of claim 1, wherein the first application and the content reproduced in non-realtime are included in the digital broadcast signal.

3. The reception apparatus of claim 1, wherein the first signaling data is a service layer signaling and includes information to manage an application lifecycle.

4. The reception apparatus of claim 1, wherein the metadata is second signaling data which is different signaling data from the first signaling data.

5. The reception apparatus of claim 1, wherein the metadata includes at least first information associated with the content, and second information associated with a second application that processes the content.

6. The reception apparatus of claim 5, wherein the second information includes information associated with the second application which is configured to refer to the content.

7. The reception apparatus of claim 5, wherein the first information includes path information which specifies a path where the content is delivered.

8. The reception apparatus of claim 7, wherein the path information specifies a Real-Time Object Delivery over Unidirectional Transport (ROUTE) session where the content is delivered.

9. The reception apparatus of claim 5, wherein the first application and the second application are applications developed using a given markup language.

10. A data processing method of a reception apparatus, the data processing method comprising the steps of:

the reception apparatus receiving a digital broadcast signal;

the reception apparatus acquiring a first application that handles acquisition of content reproduced in non-realtime, the first application acquired on the basis of first signaling data included in the digital broadcast signal;

the reception apparatus acquiring metadata, which includes information for controlling the content acquisition in response to operation of the first application, the metadata included in the digital broadcast signal; and the reception apparatus controlling the acquisition of the content reproduced in non-realtime by controlling the operation of the first application on the basis of the metadata.

11. A transmission apparatus comprising:
processing circuitry configured to:
generate metadata that includes information for controlling acquisition of content reproduced in non-realtime, generate a first application that handles the content acquisition, and
send the metadata and the first application included in a digital broadcast signal that includes first signaling data for acquiring the first application.

12. The transmission apparatus of claim 11, wherein the first application and the content reproduced in non-realtime are included in the digital broadcast signal.

13. The transmission apparatus of claim 11, wherein the first signaling data is a service layer signaling and includes information to manage an application lifecycle.

14. The transmission apparatus of claim 11, wherein the metadata is second signaling data which is different signaling data from the first signaling data.

15. The transmission apparatus of claim 11, wherein the metadata includes at least first information associated with the content, and second information associated with a second application that processes the content.

16. The transmission apparatus of claim 15, wherein the second information includes information associated with the second application which is configured to refer to the content.

17. The transmission apparatus of claim 15, wherein the first information includes path information which specifies a path where the content is delivered.

18. The transmission apparatus of claim 15, wherein the processing circuitry sends first control information for controlling operation of the first application and second control information for controlling operation of the second application.

19. The transmission apparatus of claim 15, wherein the first application and the second application are applications developed using a given markup language.

20. A data processing method of a transmission apparatus, the data processing method comprising the steps of:

the transmission apparatus generating metadata that includes information for controlling acquisition of content to be reproduced in non-realtime;

the transmission apparatus generating a first application that handles the content acquisition; and the transmission apparatus sending the metadata and the first application included in a digital broadcast signal that includes first signaling data for acquiring the first application.

* * * * *